(12) United States Patent
Pattan et al.

(10) Patent No.: US 10,992,618 B2
(45) Date of Patent: Apr. 27, 2021

(54) METHOD FOR MANAGING SHORT DATA SERVICE (SDS) IN MISSION CRITICAL DATA (MC DATA) COMMUNICATION SYSTEM

(71) Applicant: Samsung Electronics Co., Ltd., Suwon-si (KR)

(72) Inventors: Basavaraj Jayawant Pattan, Bangalore (IN); Suresh Chitturi, Bangalore (IN); Bhargav Madishetty, Bangalore (IN); Nishant Gupta, Bangalore (IN); Sapan Pramodkumar Shah, Bangalore (IN); Siva Prasad Gundur, Bangalore (IN); Vijay Sangameshwara, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/331,020

(22) PCT Filed: Sep. 7, 2017

(86) PCT No.: PCT/KR2017/009842
§ 371 (c)(1),
(2) Date: Mar. 6, 2019

(87) PCT Pub. No.: WO2018/048230
PCT Pub. Date: Mar. 15, 2018

(65) Prior Publication Data
US 2019/0199666 A1  Jun. 27, 2019

(30) Foreign Application Priority Data

Sep. 7, 2016 (IN) .............................. 201641030609
Oct. 28, 2016 (IN) .............................. 201641037103

(51) Int. Cl.
*H04L 12/58* (2006.01)
*H04L 29/08* (2006.01)
*H04L 12/18* (2006.01)

(52) U.S. Cl.
CPC .......... *H04L 51/10* (2013.01); *H04L 12/1895* (2013.01); *H04L 51/30* (2013.01); *H04L 67/14* (2013.01); *H04L 12/189* (2013.01)

(58) Field of Classification Search
CPC ..... H04L 51/10; H04L 12/1895; H04L 51/30; H04L 67/14
See application file for complete search history.

(56) References Cited

U.S. PATENT DOCUMENTS 7,725,543 B2 * 5/2010 Shibata ................ G06Q 10/107
709/206
8,732,462 B2 * 5/2014 Bhathena .............. H04L 9/0825
713/156

(Continued)

FOREIGN PATENT DOCUMENTS

CN       104602351 A     5/2015
EP       1 310 115 A1    5/2003

(Continued)

OTHER PUBLICATIONS

Salkintzis_WO2006-094087A2.pdf (Year: 2006).*

(Continued)

*Primary Examiner* — Nasser M Goodarzi
*Assistant Examiner* — Adil Ocak
(74) *Attorney, Agent, or Firm* — Jefferson IP Law, LLP

(57) ABSTRACT

Embodiments herein provide a systems and methods for managing short data service (SDS) in on-network and off-network mission critical data (MC Data) communication system. The various embodiments provide one-to-one SDS and a group SDS in the on-network MC Data communica- (Continued)

tion system for a unidirectional communication. The various embodiments provide one-to-one SDS and a group SDS in the on-network MC Data communication system for a bidirectional communication. Further, the various embodiments provide a one-to-one SDS and a group SDS in an off-network MC Data communication system for a unidirectional communication.

12 Claims, 17 Drawing Sheets

(56) References Cited

U.S. PATENT DOCUMENTS

| | | | |
|---|---|---|---|
| 9,872,137 B2* | 1/2018 | Lee | H04W 4/10 |
| 2005/0013417 A1 | 1/2005 | Zimmers et al. | |
| 2009/0279455 A1 | 11/2009 | Wang et al. | |
| 2012/0165060 A1* | 6/2012 | Klemettinen | H04Q 3/72 455/518 |
| 2016/0066163 A1 | 3/2016 | Agulnik et al. | |
| 2016/0112857 A1 | 4/2016 | Wu et al. | |
| 2017/0262515 A1* | 9/2017 | Deshmukh | G06F 16/258 |

FOREIGN PATENT DOCUMENTS

| | | |
|---|---|---|
| EP | 2566290 A1 | 3/2013 |
| WO | 02/17659 A1 | 2/2002 |
| WO | 2016/006908 A1 | 1/2016 |
| WO | 2018/066965 A1 | 4/2018 |
| WO | 2018/182245 A1 | 10/2018 |

OTHER PUBLICATIONS

3GPP; 3rd Generation Partnership Project; Technial Specification Group Services and System Aspects; Feasibility study of mission critical data communications (Release 14); 3GPP TR 22.880 V14.0.0; XP 051046986; Dec. 2015; Valbonne, France.

3GPP; 3rd Generation Partnership Project; Technial Specification Group Services and System Aspects; Functional Architecture and Information Flows to Support Mission Critical Data (MCData); Stage 2 (Release 14); 3GPP TS 23.282 V0.1.0; XP051172377; Aug. 2016; Valbonne, France.

European Search Report dated May 13, 2019; European Appln. No. 17849114.8-1216.

3GPP; 3rd Generation Partnership Project; Technial Specification Group Services and System Aspects; Functional Architecture and Information Flows to Support Mission Critical Data (MCData); Stage 2 (Release 14); 3GPP TS 23.282 V14.1.0; XP051290519; Mar. 2017; Valbonne, France.

Indian Office Action dated Mar. 20, 2020; Indian Appln. No. 201641030609.

European Search Report dated Apr. 6, 2020; European Appln No. 17 849 114.8-1216.

Chinese Office Action with English translation dated Feb. 20, 2021; Chinese Appln. No. 201780054592.7.

* cited by examiner

METHOD FOR MANAGING SHORT DATA SERVICE (SDS) IN MISSION CRITICAL DATA (MC DATA) COMMUNICATION SYSTEM

CROSS-REFERENCE TO RELATED APPLICATION(S)

This application is a U.S. National Stage application under 35 U.S.C. § 371 of an International application number PCT/KR2017/009842, filed on Sep. 7, 2017, which is based on and claimed priority of an Indian patent application numbers 201641030609 (PS) and 201641037103 (PS), filed on Sep. 7, 2016 and Oct. 28, 2016, respectively, in the Indian Intellectual Property Office, the disclosure of each of which is incorporated by reference herein in entirety.

BACKGROUND

1. Field

The embodiment herein generally relates to mission critical data (MC Data) communication system and more particularly relates to a method for managing short data service (SDS) in on-network and off-network MC Data communication system. The present application is based on, and claims priority from, both the Indian Application Numbers 201641030609 filed on 7 Sep. 2016 and 201641037103 filed on 28 Oct. 2016, the disclosure of which is hereby incorporated by reference herein.

2. Description of the Related Art

Public safety networks are used for Mission Critical (MC) Data/Voice/Video communications. The MC communication may include defined set of MC Data services. Such MC Data services typically build on existing third generation partnership project (3GPP) transport communication mechanisms provided by the evolved packet system (EPS) architectures to establish, maintain, and terminate the actual communication path(s) among the users. Typically, a MC Data server provides centralized support for such MC Data services. The MC Data server further can facilitate or govern MC Data communication among various users part of the network.

In an alternate deployment, such MC Data services can be off-network. In such deployments the MC Data devices communicate directly with each other without a server for centralized support for the service.

The MC Data services are designed to provide one-to-one, one-to-many, and group communications between users. In the present scenario, the public safety community requires services beyond voice i.e. data and video applications. MC Data makes frequent use of a set of capabilities and enablers that allows for many end user services to be built on a common platform. A Short data service (SDS) feature is one such capability for use in the MC Data Service. The SDS can be used on its own or in combination with other services, or may be used by other services to realize certain features such as sharing of a location, presence-like data, and command instructions to perform specific operations.

The SDS functionality may include one-to-one messaging or one-to-many or group messaging. In addition, the SDS service may offer the ability to provide thread management to allow for multiple message flows. Hence an effective functional model and methods are necessary to support the SDS and its associated features.

The above information is presented as background information only to help the reader to understand the present invention. Applicants have made no determination and make no assertion as to whether any of the above might be applicable as prior art with regard to the present application.

SUMMARY

Embodiments herein provide a method for managing short data service (SDS) in on-network mission critical data (MC Data) communication system. The method includes receiving a MC Data request message from a first MC Data user equipment (UE) and transmitting the MC Data request message to a second MC Data UE. Further, the method includes receiving a MC Data disposition notification message from the second MC Data UE based on an information element enabled in the MC Data request message and transmitting the MC Data disposition notification to the first MC Data UE.

The principal object of the embodiments herein is to provide a method for managing short data service (SDS) in on-network mission critical data (MC Data) communication system.

BRIEF DESCRIPTION OF THE DRAWINGS

The embodiments herein will be better understood from the following detailed description with reference to the drawings, in which.

DETAILED DESCRIPTION

Figure 1A:
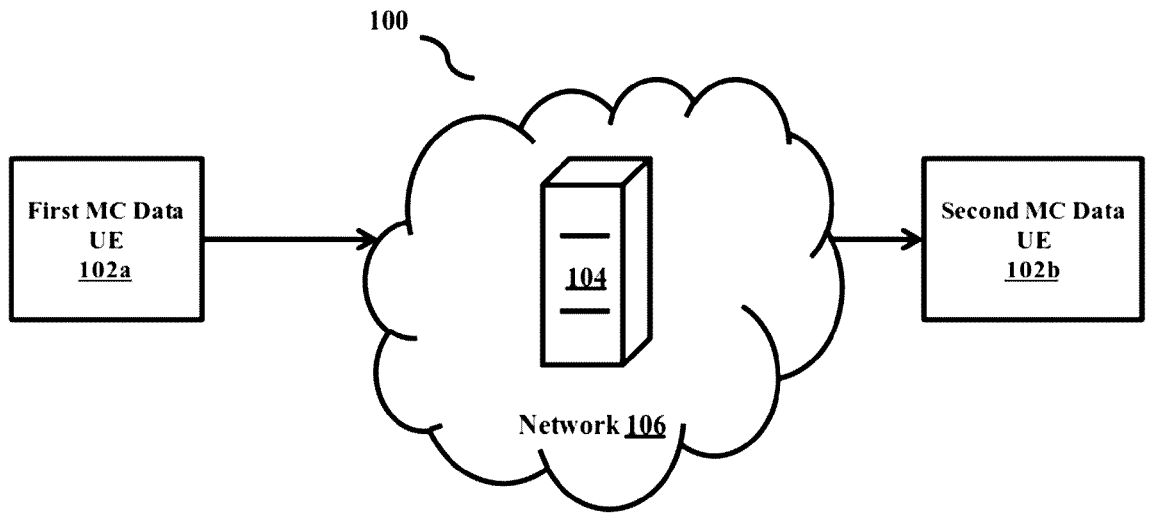
FIGS. 1A-1D illustrate example on-network MC Data communication systems for managing SDS, according to an embodiment as disclosed herein.

Accordingly, embodiments herein provide a method for managing SDS in on-network MC Data communication system. The method includes receiving a MC Data request message from a first MC Data UE for transmitting SDS data request message to a group of second MC Data UEs and identifying the group of second MC Data UEs. Further, the method includes transmitting the MC Data standalone data request message to the group of second MC Data UEs. The method also includes receiving a MC Data disposition notification message from the group of second MC Data UEs based on an information element enabled in the MC Data request message. Further, the method includes transmitting the MC Data disposition notification message by aggregating the MC Data disposition notification messages received from the group of second MC Data UEs to the first MC Data UE.

Accordingly, embodiments herein provide a MC Data server for managing SDS in on-network MC Data communication system. The MC Data server includes a processor, a memory coupled to the processor, and a communicator, coupled to the processor and the memory. The communicator is configured to receive a MC Data request message from a first MC Data UE and transmit the MC Data request message to a second MC Data UE. Further, the communicator is configured to receive a MC Data disposition notification message from the second MC Data UE based on an information element enabled in the MC Data request message. Furthermore, the communicator is configured to transmit the MC Data disposition notification to the first MC Data UE.

Accordingly, embodiments herein provide a MC Data server for managing short data service (SDS) in on-network mission critical data (MC Data) communication system. The MC Data server includes a processor, a memory coupled to the processor, and a communicator, coupled to the processor and the memory. The communicator is configured receive a MC Data standalone request message from a first MC Data UE for transmitting SDS message to a group of second MC Data UEs and transmit the MC Data standalone request message to the group of second MC Data UEs. Further, the communicator receives a MC Data disposition notification message from the group of second MC Data UEs based on an information element enabled in the MC Data standalone request message and transmits the MC Data disposition notification message by aggregating the MC Data disposition notification messages received from the group of second MC Data UEs to the first MC Data UE.

Accordingly the embodiments herein provide a method for managing short data service (SDS) in an off-network mission critical Data (MC Data) communication system. The method includes transmitting, by a first MC Data UE, a MC Data standalone request message to a second MC Data UE. Further, the method includes receiving, by the first MC Data UE, a MC Data disposition notification message from the second MC Data UE based on a disposition request in the MC Data standalone request message.

Accordingly the embodiments herein provide a method for managing short data service (SDS) in a off-network mission critical Data (MC Data) communication system. The method includes transmitting, by a first MC Data UE, a MC Data standalone request message to a group of second MC Data UEs. Further, the method includes receiving, by the first MC Data UE, a MC Data disposition notification message from each of the second MC Data UE based on a disposition request in the MC Data standalone request message.

Accordingly the embodiments herein provide a first MC Data UE for managing short data service (SDS) in an off-network mission critical Data (MC Data) communication system. The first MC Data UE includes a processor, a memory coupled to the processor and a SDS communicator coupled to the processor and the memory. The SDS communicator configured to transmit, a MC Data standalone request message to a second MC Data UE. Further, the SDS communicator configured to receive, a MC Data disposition notification message from the second MC Data UE based on a disposition request in the MC Data standalone request message.

Accordingly the embodiments herein provide a first MC Data UE for managing short data service (SDS) in an off-network mission critical Data (MC Data) communication system. The first MC Data UE includes a processor, a memory coupled to the processor and a SDS communicator coupled to the processor and the memory. The SDS communicator is configured to transmit a MC Data standalone request message to a group of second MC Data UEs. Further, the SDS communicator is configured to receive a MC Data disposition notification message from each of the second MC Data UE based on a disposition request in the MC Data standalone request message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method for managing short data service (SDS) in on-network mission critical data (MC Data) communication system.

Another object of the embodiments herein is to provide a method for managing one-to-one SDS in the on-network MC Data communication system for a unidirectional communication.

Another object of the embodiments herein is to provide a method for managing group SDS in the on-network MC Data communication system for the unidirectional communication.

Another object of the embodiments herein is to provide a method for managing one-to-one SDS in the on-network MC Data communication system for a bidirectional communication.

Another object of the embodiments herein is to provide a method for managing group SDS in the on-network MC Data communication system for the bidirectional communication.

Another object of the embodiments herein is to provide a method for managing SDS multicast data over MBMS in the on-network MC Data communication system.

Another object of the embodiments herein is to provide a method for managing one-to-one SDS in an off-network MC Data communication system for a unidirectional communication Another object of the embodiments herein is to provide a method for managing group SDS in the off-network MC Data communication system for the unidirectional communication.

1. A method for managing short data service (SDS) in on-network mission critical Data (MC Data) communication system, the method comprising:
receiving, by a MC Data server, a MC Data request message from a first MC Data UE;
transmitting, by the MC Data server, the MC Data request message to a second MC Data UE;
receiving, by the MC Data server, a MC Data disposition notification message from the second MC Data UE based on an information element enabled in the MC Data request message; and
transmitting, by the MC Data server, the MC Data disposition notification message to the first MC Data UE.

2. wherein the MC Data server receives a MC Data standalone request message from the first MC Data UE, wherein the MC Data standalone request message comprises data intended to the second MC Data UE in at least one of a text, a binary, application data, location information and a uniform resource locator (URL).

3. wherein the MC Data standalone request message comprises a conversation identifier, a payload destination type, a disposition request type and a transaction type as the information elements.

4. wherein the MC Data server authorizes the first MC Data UE for transmitting the MC Data standalone request message to the second MC Data UE.

5. wherein the MC Data server transmits the MC Data standalone request message with data to the second MC Data UE on signaling control plane over MC Data-SDS-1.

6. wherein the MC Data server receives disposition notification for at least one of delivery of MC Data to the second MC Data UE, and reading of the MC Data at the second MC Data UE on the signaling plane.

7. wherein the MC Data server transmits the received disposition notification to the first MC Data UE on signaling control plane over MC Data-SDS-1.

8. wherein the MC Data server receives a MC Data standalone session data request message from the first MC Data UE, wherein the MC Data server establishes a session with the second MC Data UE by transmitting the MC Data standalone session data request message to the second MC Data UE.

9. wherein the MC Data server authorizes the first MC Data UE for transmitting the MC Data standalone session data request message to the second MC Data UE.

10. wherein the MC Data server receives a MC Data standalone session data response message from the second MC Data UE in response to the MC Data standalone session data request message and forwards the received MC Data standalone session data response message to the first MC Data UE.

11. wherein the MC Data server receives a MC Data message from the first MC Data UE and the MC Data server transmits the MC Data message to the second MC Data UE using the media plane over one of the MC Data-SDS-2 and MC Data-SDS-3.

12. wherein the MC Data standalone session data request message comprises an identifier for relating a plurality of SDS messages at the second MC Data UE, wherein the MC Data server exchanges a plurality of SDS messages between the first MC Data UE and the second MC Data UE based on the identifier using the media plane.

13. A method for managing short data service (SDS) in on-network mission critical data (MC Data) communication system, the method comprising:
receiving, by a MC Data server, a MC Data request message from a first MC Data UE for transmitting SDS message to a group of second MC Data UEs;
identifying, by the MC Data server, the group of second MC Data UEs;
transmitting, by the MC Data server, the MC Data request message to the group of second MC Data UEs;
receiving, by the MC Data server, a MC Data disposition notification message from the group of second MC Data UEs based on an information element enabled in the MC Data request message; and
transmitting, by the MC Data server, the MC Data disposition notification message by aggregating the MC Data disposition notification messages received from the group of second MC Data UEs to the first MC Data UE.

14. wherein the MC Data server receives a MC Data request message from the first MC Data UE, wherein the MC Data request message comprises data intended to the second MC Data UE in at least one of a text, a binary, application data, location information and a uniform resource locator (URL).

15. wherein the MC Data request message comprises a conversation identifier, a payload destination type, a disposition request type and a transaction type as the information elements.

16. wherein the MC Data server authorizes the first MC Data UE for transmitting the MC Data request message to the group of second MC Data UEs.

17. wherein the MC Data server transmits the MC Data request message with data to the group of second MC Data UEs on signaling control plane over MC Data-SDS-1.

18. wherein the MC Data server receives a MC Data standalone session data request from the first MC Data UE and transmits the received MC Data standalone session data request to the group of second MC Data UEs for establishing a session for transmitting data.

19. wherein the MC Data server receives a MC Data standalone session data response from the group of second MC Data UEs in response to the MC Data standalone session data request message for establishing a session for transmitting data.

20. wherein the MC Data server transmits the data to the group of second MC Data UEs using the media plane over one of MC Data-SDS-2 and MC Data-SDS-3.

21. wherein the MC Data server receives a MC Data group data request message from the first MC Data UE with an identifier for relating a plurality of SDS messages at the MC Data UE, wherein the MC Data server exchanges a plurality of SDS messages between the first MC Data UE and group of the second MC Data UEs.

22. wherein the MC Data server receives MC Data request through unicast from the first MC Data UE for transmitting data to the group of second MC Data UEs through broadcast over MC Data SDS-3 by establishing MBMS bearer.

23. wherein the MC Data server receives MC Data disposition notification message from the group of second MC Data UEs through unicast.

24. A mission critical data (MC Data) server for managing short data service (SDS) in on-network MC Data communication system, the MC Data server comprising:
 a processor;
 a memory coupled to the processor; and
 a communicator, coupled to the processor and the memory, configured to:
 receive a MC Data request message from a first MC Data UE;
 transmit the MC Data request message to a second MC Data UE;
 receive a MC Data disposition notification message from the second MC Data UE based on an information element enabled in the MC Data request message; and
 transmit the MC Data disposition notification to the first MC Data UE.

25. wherein the communicator configured to receive a MC Data standalone request message from the first MC Data UE, wherein the MC Data standalone request message comprises data intended to the second MC Data UE in at least one of a text, a binary, application data, location information and a uniform resource locator (URL).

26. wherein the MC Data standalone request message comprises a conversation identifier, a payload destination type, a disposition request type and a transaction type as the information elements.

27. wherein the MC Data server comprises a MC Data manager configured to authorize the first MC Data UE for transmitting the MC Data standalone request message to the second MC Data UE.

28. wherein the communicator configured to transmits the MC Data standalone request message with data to the second MC Data UE on signaling control plane over MC Data-SDS-1.

29. wherein the communicator configured to receive disposition notification for at least one of delivery of MC Data to the second MC Data UE, and reading of the MC Data at the second MC Data UE on the signaling plane.

30. wherein the communicator configured to receive a MC Data standalone session data request message from the first MC Data UE, wherein the communicator configured to establish a session with the second MC Data UE by transmitting the MC Data standalone session data request message to the second MC Data UE.

31. wherein the communicator configured to receive a MC Data standalone session data response from the second MC Data UE in response to the MC Data standalone session data request message.

32. wherein the communicator configured to transmit the data to the second MC Data UE using the media plane over MC Data-SDS-2 or MC Data-SDS-3.

33. wherein the MC Data standalone session data request message comprises an identifier for relating a plurality of SDS messages at the second MC Data UE, wherein the communicator exchanges a plurality of SDS messages between the first MC Data UE and the second MC Data UE based on the identifier using the media plane.

34. A mission critical data (MC Data) server for managing short data service (SDS) in on-network MC Data communication system, the MC Data server comprising:
 a processor;
 a memory coupled to the processor; and
 a communicator, coupled to the processor and the memory, configured to:
 receive a MC Data request message from a first MC Data UE for transmitting SDS message to a group of second MC Data UEs;
 transmit the MC Data request message to the group of second MC Data UEs;
 receive a MC Data disposition notification message from the group of second MC Data UEs based on an information element enabled in the MC Data request message; and
 transmit the MC Data disposition notification message by aggregating the MC Data disposition notification messages received from the group of second MC Data UEs to the first MC Data UE.

35. wherein the MC Data server comprises a MC Data manager configured to identify a group identifier associated with the group of second MC Data UEs.

36. wherein the MC Data request message comprises a conversation identifier, a payload destination type, a disposition request type and a transaction type as the information elements.

37. wherein the communicator configured to transmit the MC Data request message with data to the group of second MC Data UEs on signaling control plane over the MC Data-SDS-1.

38. wherein the communicator configured to receive a MC Data standalone session data response from the group of second MC Data UEs in response to the MC Data standalone session data request message for establishing a session for transmitting data.

39. wherein the communicator configured to transmit the data to the group of second MC Data UEs using the media plane over one of MC Data-SDS-2 and MC Data-SDS-3.

40. wherein the communicator configured to receive a MC Data group data request message from the first MC Data client with an identifier for relating a plurality of SDS messages between the first MC Data UE and group of the second MC Data UEs.

41. wherein the communicator configured to receive MC Data group request through unicast from the first MC Data UE for transmitting data to the group of second MC Data UEs through broadcast over MC Data SDS-3 by establishing MBMS bearer.

42. wherein the communicator configured to receive MC Data disposition notification message from the group of second MC Data UEs through unicast.

43. A method for managing short data service (SDS) in a off-network mission critical Data (MC Data) communication system, the method comprising:
transmitting, by a first MC Data UE, a MC Data standalone request message to a second MC Data UE; and
receiving, by the first MC Data UE, a MC Data disposition notification message from the second MC Data UE based on a disposition request in the MC Data standalone request message.

44. wherein the first MC Data UE transmits the MC Data standalone request message with a conversation identifier to the second MC Data UE, wherein the first MC Data UE receives the disposition notification message from the second MC Data UE on a signaling control plane.

45. A method for managing short data service (SDS) in an off-network mission critical Data (MC Data) communication system, the method comprising:
transmitting, by a first MC Data UE, a MC Data standalone request message to a group of second MC Data UEs;
receiving, by the first MC Data UE, a MC Data disposition notification message from each of the second MC Data UE based on a disposition request in the MC Data standalone request message.

46. A first MC Data UE for managing short data service (SDS) in a off-network mission critical Data (MC Data) communication system, the first MC Data UE comprises:
a processor;
a memory coupled to the processor; and
a SDS communicator, coupled to the processor and the memory, configured to:
transmit, a MC Data standalone request message to a second MC Data UE; and
receive, a MC Data disposition notification message from the second MC Data UE based on a disposition request in the MC Data standalone request message.

47. wherein the SDS communicator configured to transmit the MC Data standalone request message with a conversation identifier to the second MC Data UE, wherein the SDS communicator configured to receive the disposition notification message from the second MC Data UE on a signaling control plane.

48. A first MC Data UE for managing short data service (SDS) in a off-network mission critical Data (MC Data) communication system, the first MC Data UE comprises:
a processor;
a memory coupled to the processor; and
a SDS communicator, coupled to the processor and the memory, configured to:
transmit a MC Data standalone request message to a group of second MC Data UEs; and
receive a MC Data disposition notification message from each of the second MC Data UE based on a disposition request in the MC Data standalone request message.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "first" and "second" herein are used merely for labeling purpose and can be used interchangeably without departing from the scope of the embodiments.

The embodiments herein are adopted in 3GPP TS 23.282: Functional model for short data service (SDS).

Accordingly the embodiments herein provide a method for managing short data service (SDS) in mission critical data (MC Data) communication system. The method includes receiving a MC Data request message from a first MC Data UE and transmitting the MC Data request message to a second MC Data UE. Further, the method includes receiving a MC Data disposition notification message from the second MC Data UE based on an information element enabled in the MC Data request message and transmitting the MC Data disposition notification to the first MC Data UE.

In an embodiment, the MC Data server receives a MC Data standalone request message from the first MC Data UE.

The MC Data standalone request message includes data intended to the second MC Data UE in at least one of a text, a binary, application data and a uniform resource locator (URL). The MC Data standalone request message includes a conversation identifier, a payload destination type, a disposition type and a transaction type as the information elements.

In an embodiment, the MC Data server authorizes the first MC Data UE for transmitting the MC Data standalone request message to the second MC Data UE. Further, the MC Data server transmits the MC Data standalone request message with data to the second MC Data UE on signaling control plane MC Data-SDS-1.

In an embodiment, the MC Data server receives disposition notification for at least one of delivery of MC Data to the second MC Data UE, and reading of the MC Data at the second MC Data UE on the signaling plane.

In another embodiment, the MC Data server receives a MC Data standalone session data request message from the first MC Data UE, wherein the MC Data server establishes a session with the second MC Data UE by transmitting the MC Data standalone session data request message to the second MC Data UE. Further, the MC Data server receives a MC Data standalone session data response from the second MC Data UE in response to the MC Data standalone session data request message. Furthermore, the MC Data server transmits the data to the second MC Data UE using the media plane over MC Data-SDS-2.

In an embodiment, the MC Data standalone data session data request message includes an identifier for transmitting a plurality of SDS messages to the second MC Data UE, wherein the MC Data server exchanges a plurality of SDS messages between the first MC Data UE and the second MC Data UE based on the identifier using the media plane.

In various embodiments, the method includes receiving, by a MC Data server, a MC Data standalone data request message from a first MC Data UE for transmitting SDS message to a group of second MC Data UEs. The method includes identifying a group identifier associated with the group of second MC Data UEs and transmitting the MC Data standalone request message to the group of second MC Data UEs. Further, the method also includes receiving a MC Data disposition notification message from the group of second MC Data UEs based on an information element enabled in the MC Data standalone request message and transmitting the MC Data disposition notification message by aggregating the MC Data disposition notification messages received from the group of second MC Data UEs to the first MC Data UE. The MC Data server includes a MC Data manager which identifies a group identifier associated with the group of second MC Data UEs. The information element in the MC Data standalone request message can be a conversation identifier, a payload destination type, a disposition type and a transaction type. The MC Data standalone request message is transmitted with data to the group of second MC Data UEs on signaling control plane over MC Data-SDS-1.

In another embodiment, the MC Data server receives a MC Data standalone session data response from the group of second MC Data UEs in response to the MC Data standalone session data request message for establishing a session for transmitting data. Further, the MC Data server transmits the data to the group of second MC Data UEs using the media plane over MC Data-SDS-2.

In another embodiment, the MC Data server receives a MC Data group data request message from the first MC Data UE with an identifier for exchanging a plurality of SDS messages between the first MC Data UE and group of the second MC Data UEs using the media plane over MC Data-SDS-2. The identifier can be the conversation identifier.

In another embodiment, the MC Data server receives MC Data request through unicast from the first MC Data UE for transmitting data to the group of second MC Data UEs through broadcast over MC Data SDS-3 by establishing MBMS bearer. Further, the MC Data server receives MC Data disposition notification message from the group of second MC Data UEs through unicast using signaling control plane over MC Data-SDS-1.

While the above mentioned embodiments are facilitated by the MC Data server within the network (on-network), in various embodiments a system and method for short data service in off-network (i.e., without the MC Data server) mission critical data communications is provided. A functional model is provided to support MC Data UEs, which is off the coverage of infrastructure network to be able to exchange short data messages.

Referring now to the drawings, and more particularly to FIGS. 1 through 19, where similar reference characters denote corresponding features consistently throughout the figures, there are shown preferred embodiments.

FIGS. 1A-1D illustrates example communication systems for SDS in MC Data communication, according to an embodiment as disclosed herein.

Before describing the embodiments, the MC Data communication system is described herein briefly. In general, not shown in FIGS. 1A-1D, a MC Data communication system 100 includes a first MC Data UE 102a, a group of second MC DataUEs 102b-102n and a MC Data server 104 in a network 106. The MC Data server 104 serves as a centralized server to enable the network 106 to provide MC Data service to MC Data UEs 102a-102n.

In some examples, the network 106 includes 3GPP E-UTRAN access elements (not shown) and 3GPP E-UTRAN core elements (not shown). For example, the first MC Data UE 102a gains access to the network 106 through a LTE-Uu interface (not shown) or through an evolved Node B (eNB, not shown). Further, the MC Data server 104 may couple to various access/core elements of the network 106. For example, the MC Data server 104 can couple to a serving gateway/packet data gateway through one or more suitable interface reference points. Various core elements such as mobile management entity (MME) and multimedia broadcast/multicast service gateway (MBMS GW) may provide core 3GPP E-UTRAN services to the MC Data server 104 and/or the MC Data UEs 102a-102n, to facilitate MC Data communication services by the network 106.

In an embodiment, the MC Data UEs 102a-102n can be for e.g., an electronic device, a User Equipment (UE), or the like. Each of the MC Data UEs 102a-102n can include a MC Data client (i.e., an application) for communicating with the MC Data server 104. The first MC Data UE 102a includes a first MC Data client; the second MC Data UE 102b includes a second MC Data client and so on.

The MC Data client residing at each of the MC Data UEs 102a-102n, acts as user agent for all the MC Data application transactions. The MC Data client supports SDS, file distribution, data streaming and IP connectivity MC Data capabilities utilized by MC Data services like conversation management, robots control, enhanced status, database enquiries and secured internet.

The MC Data server 104 provides centralized support for MC Data services suite. Conversation management, robots, enhanced status, database enquiries and secured internet MC Data services requiring one-to-one data or group communication are realized using SDS, file distribution, data streaming and Internet Protocol (IP) connectivity MC Data communication capabilities. All the MC Data clients supporting users belonging to a single group are required to use the same MC Data server 104 for that group. In one embodiment, HTTP is used as communication transport means for MC Data communication.

Now Referring to FIG. 1A, the MC Data communication system 100 includes the first MC Data UE 102a, the MC Data server 104 in the network 106 and the second MC Data UE 102b. The MC Data server 104 facilitates/provides one-to-one unidirectional SDS communication between the first MC Data UE 102a and the second MC Data UE 102b through the network 106.

In an embodiment, the MC Data server 104 receives the MC Data standalone request message from the first MC Data UE 102a and transmits the MC Data standalone request message with data to the second MC Data UE 102b on signaling control plane over MC Data-SDS-1. The MC Data standalone request message includes the data intended to the second MC Data UE 102b in at least one of a text, a binary, application data and a uniform resource locator (URL). Further, the MC Data standalone request message includes information elements such as a conversation identifier, a payload destination type, a disposition type and a transaction type.

Further, the MC Data server 104 receives the MC Data disposition notification message from the second MC Data UE 102b based on the information element enabled in the MC Data standalone request message and transmits the MC Data disposition notification to the first MC Data UE 102a.

In another embodiment, the MC Data server 104 receives a MC Data standalone session data request message from the first MC Data UE 102a and establishes a session with the second MC Data UE 102b by transmitting the MC Data standalone session data request message to the second MC Data UE 102b. Further, the MC Data server 104 receives a MC Data standalone session data response message from the second MC Data UE 102b in response to the MC Data standalone session data request message. Furthermore, the MC Data server 104 transmits the data to the second MC Data UE 102b using the media plane over MC Data-SDS-2.

Figure 1B:
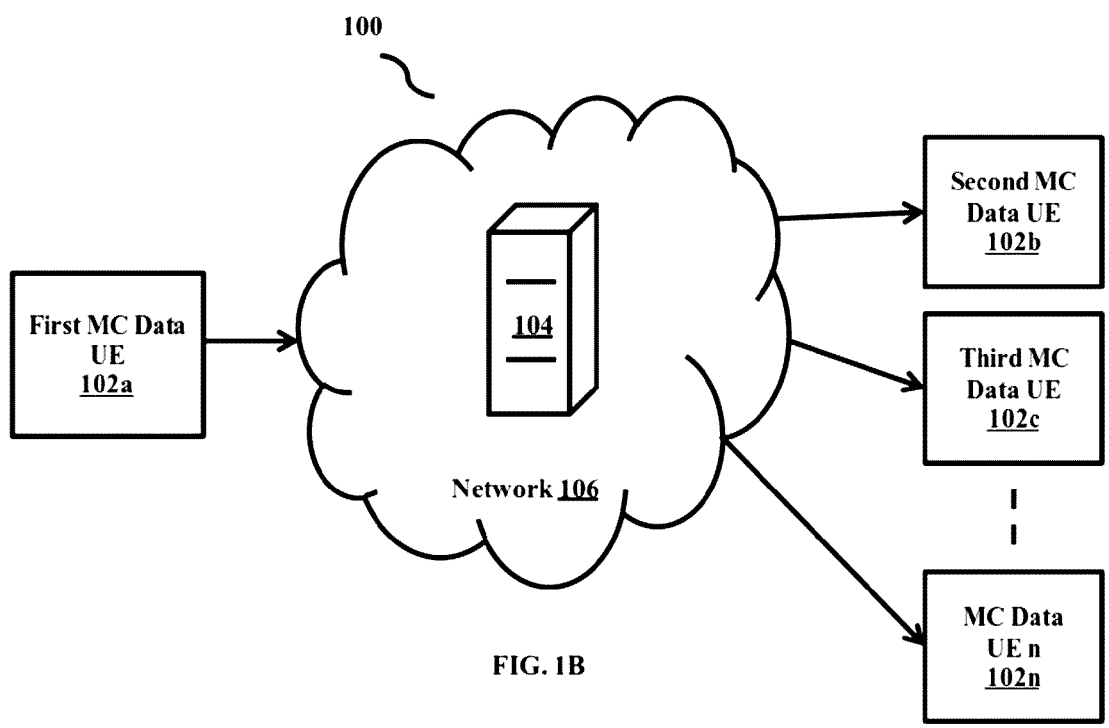

Referring to FIG. 1B, the MC Data communication system 100 includes the first MC Data UE 102a, the MC Data server 104 in the network 106 and the group of second MC Data UEs 102b-102n. The MC Data server 104 provides group unidirectional SDS communication between the first MC Data UE 102a and the group of second MC Data UEs 102b-102n.

In an embodiment, the MC Data server 104 receives a MC Data group standalone data request message from the first MC Data UE 102a for transmitting SDS standalone data request message to the group of second MC Data UEs 102b-102n and identifies the group of second MC Data UEs 102b-102n based on a group identifier. Further, the MC Data server 104 transmits the MC Data group standalone data request message to the group of second MC Data UEs 102b-102n. Furthermore, the MC Data server 104 receives the MC Data disposition notification message from the group of second MC Data UEs 102b-102n based on an information element enabled in the MC Data group standalone data request message transmits an aggregated MC Data disposition notification message to the first MC Data UE 102a. The MC Data server 104 transmits the MC Data group standalone request message with data to the group of second MC Data UEs 102b-102n on signaling control plane over MC Data-SDS-1.

In another embodiment, the MC Data server 104 receives the MC Data group standalone data request message from the first MC Data UE 102a for transmitting SDS standalone data request message to the group of second MC Data UEs 102b-102n and identifies the group of second MC Data UEs 102b-102n based on a group identifier. Further, the MC Data server 104 transmits the MC Data group standalone data request message to the group of second MC Data UEs 102b-102n. Furthermore, the MC Data server 104 receives the MC Data disposition notification message from the group of second MC Data UEs 102b-102n based on an information element enabled in the MC Data group standalone data request message transmits an aggregated MC Data disposition notification message to the first MC Data UE 102a. The MC Data server 104 transmits the data to the group of second MC Data UEs 102b-102n using the media plane over MC Data-SDS-2.

Figure 1C:
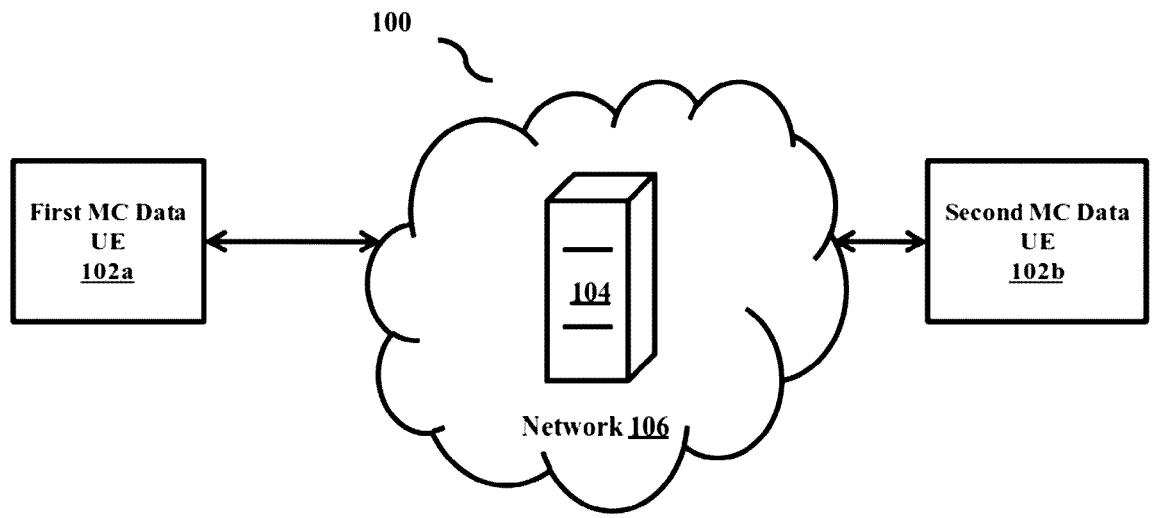

Referring to FIG. 1C, the MC Data communication system 100 includes the first MC Data UE 102a, the MC Data server 104 in the network 106 and the second MC Data UE 102b. The MC Data server 104 provides one-to-one bidirectional SDS communication between the first MC Data UE 102a and the second MC Data UE 102b.

In an embodiment, the MC Data server 104 receives a MC Data standalone session data request message from the first MC Data UE 102a and establishes a session with the second MC Data UE 102b by transmitting the MC Data standalone session data request message to the second MC Data UE 102b. Further, the MC Data server 104 receives a MC Data standalone session data response message from the second MC Data UE 102b in response to the MC Data standalone session data request message. The MC Data server 104 transmits the data to the second MC Data UE 102b using the media plane over MC Data-SDS-2. Further, the MC Data standalone session data request message includes an identifier which enables exchanging a plurality of SDS messages between the first MC Data UE 102a and the second MC Data UE 102b.

Figure 1D:
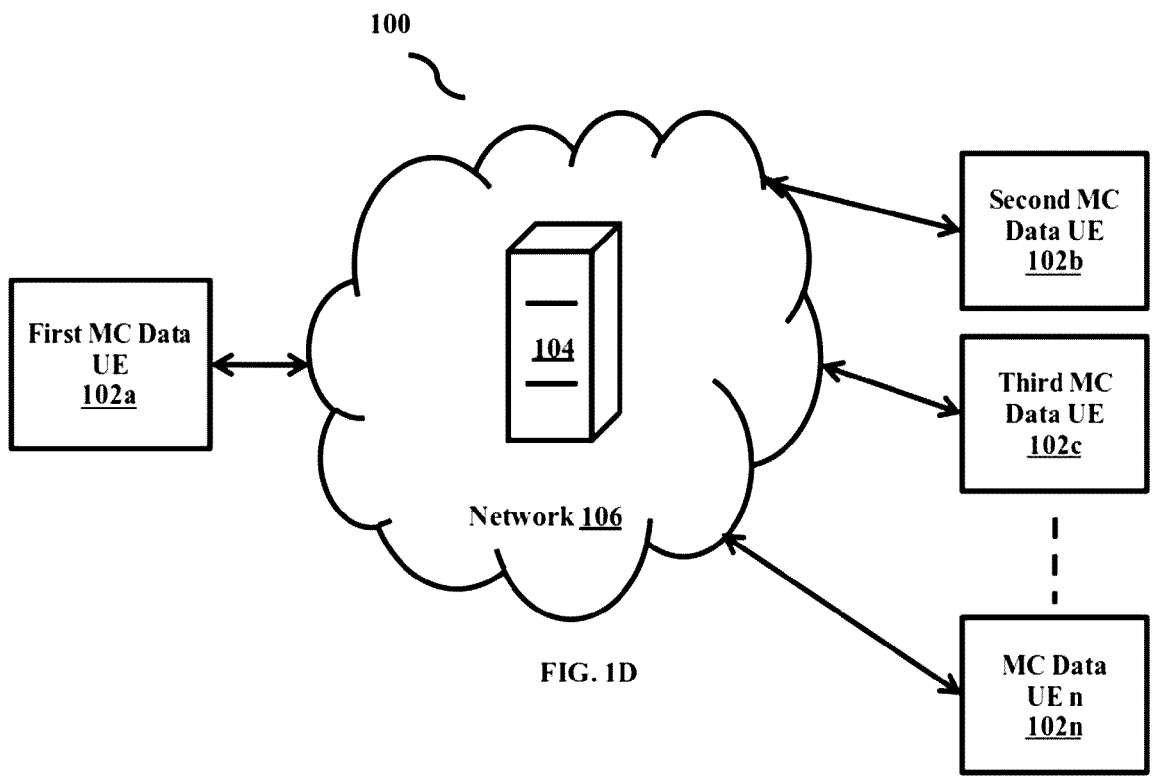

Referring to FIG. 1D, the MC Data communication system 100 includes the first MC Data UE 102a, the MC Data server 104 in the network 106 and the group of second MC Data UEs 102b-102n. The MC Data server 104 provides bidirectional SDS communication between the first MC Data UE 102a and the group of second MC Data UEs 102b-102n.

In an embodiment, the MC Data server 104 receives a MC Data group data request message from the first MC Data UE 102a with the identifier for exchanging a plurality of SDS messages between the first MC Data UE 102a and the group of the second MC Data UEs 102b-102n. The identifier is associated with the group of second MC Data UEs 102b-102n which enables the MC Data server 104 to identify the authorized group of second MC Data UEs 102b-102n. The MC Data server 104 enables exchange of a plurality of SDS messages between the first MC Data UE 102a and the group of the second MC Data UEs 102b-102n using the media plane over MC Data-SDS-2.

Figure 2:
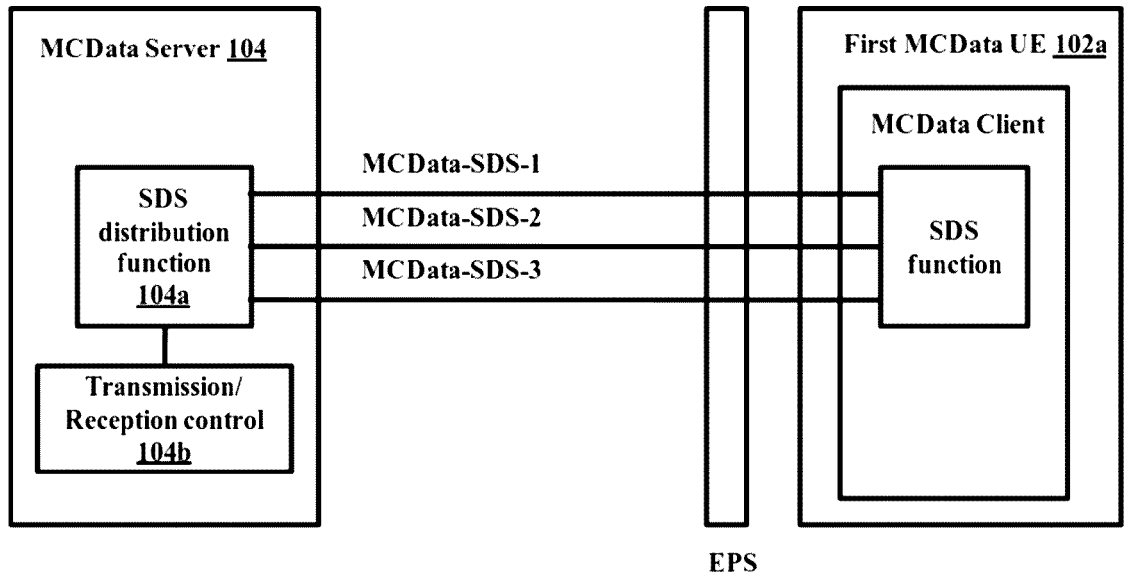
FIG. 2 is a functional model illustrating various entities in a MC Data server and a first MC Data UE for an application plane in SDS communication, according to an embodiment as disclosed herein.

FIG. 2 is a functional model illustrating various entities in the MC Data server 104 and the first MC Data UE 102a for an application plane in SDS communication, according to an embodiment as disclosed herein.

Referring to the FIG. 2, a MC Data-SDS-1 reference point is used for uplink and downlink unicast SDS data transaction over a signalling control plane by a SDS distribution function of the MC Data server 104 and SDS function of the MC Data client which is within the first MC Data UE 102*a*. Further, the MC Data-SDS-1 reference point is also used for MC Data application signalling during session establishment in support of a SDS data transfer.

A MC Data-SDS-2 reference point is used to carry uplink and downlink unicast SDS data over a media plane between the SDS distribution function of the MC Data server 104 and the SDS function of the first MC Data UE 102*a*.

A MC Data-SDS-3 reference point is used to carry downlink multicast SDS data over the media plane from the SDS distribution function of the MC Data server 104 to the SDS function of the first MC Data UE 102*a*.

The SDS data can be in the form of text, binary, application data, URL or combinations of these. In an example the SDS data can be at least one of information pertaining to applications (e.g. health parameters of first MC Data UE 102*a* for situational awareness application); information pertaining to enhanced status service; text or URL data between multiple MC Data users; application data (e.g. health parameters) to the first MC Data UE 102*a*; location information (independent or along with user or application provided data); command instructions to invoke certain operations on the first MC Data UE 102*a* (e.g. invoking UE specific applications); and application plane identities for the first MC Data UE 102*a* and the MC Data application.

A Transmission/Reception control element is responsible for transmission and reception control of MC Data between a sending MC Data UE, the MC Data server 104, and a receiving MC Data UE. The transmission and reception control function is used to provide arbitration between multiple data requests and apply the necessary policy to ensure that appropriate data is transmitted between the multiple MC Data UEs. For SDS, transmission/reception control may not apply due to small data messages, and the application of "auto-send" and "auto-receive" configurations. However, when the data requests are exceeding a certain size such as large blogs of data, files or streams, it may be necessary to control the data that is transmitted or received by the MC Data UEs.

Figure 3:
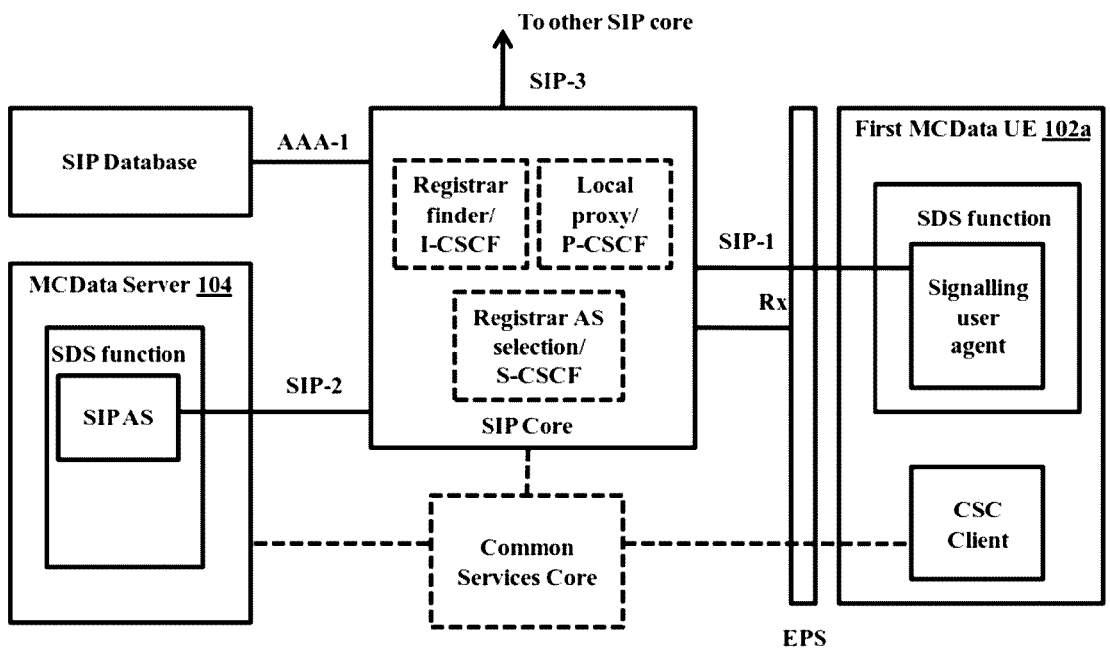
FIG. 3 is a functional model illustrating various entities in the MC Data server and the first MC Data UE for a signalling control plane in SDS communication, according to an embodiment as disclosed herein.

FIG. 3 is a functional model illustrating various entities in the MC Data server 104 and the first MC Data UE 102*a* for a signalling control plane in SDS communication, according to an embodiment as disclosed herein.

Referring to the FIG. 3, the functional model for signaling control plane has various SIP entities which include a signalling user agent, a SIP AS, a SIP core, a SIP database. The signalling user agent acts as the SIP user agent (for both the MC Data UEs 102*a*-102*n* and the MC Data server 104) for all SIP transactions. The SIP AS supports functions such as influencing and impacting the SIP session on behalf of the MC Data service. In the IM CN subsystem, the SIP AS is provided by the Application Server as defined in 3GPP TS 23.002 [3]. The SIP core contains a number of sub-entities responsible for registration, service selection and routing in the signalling control plane.

The SIP core shall be compliant with one of 3GPP TS 23.228 [5], i.e. the SIP core is a 3GPP IP multimedia core network subsystem; a SIP core which internally need not comply with the architecture of 3GPP TS 23.228 [5], but with the reference points that are defined in sub clause 7.5.3 (if exposed), compliant to the reference points defined in 3GPP TS 23.002 [3]. The data related to the functions of the SIP core, e.g. for data for application service selection, the identity of the serving registrar or authentication related information may be provided by the public land mobile network (PLMN) operator responsible for the bearer plane.

In this case, the SIP database that is the source of the data may be part of the HSS. Alternatively, the data may be provided by the MC Data service provider. In this case, the source of the data may be the MC Data service provider's SIP database.

The reference points for the SIP and other signalling include reference point SIP-1 (between the signalling user agent and the SIP core): The SIP-1 reference point, which exists between the signalling user agent and the SIP core for establishing a session in support of MC Data, shall use the Gm reference point as defined in 3GPP TS 23.002 [3] (with necessary enhancements to support MC Data requirements and profiled to meet the minimum requirements for support of MC Data). The SIP-1 reference point fulfils the requirements of the GC1 reference point specified in3GPP TS 23.468 [10]. The SIP-1 reference point is used for SIP registration, authentication and security to the service layer, MC Data user or application data, disposition request and notification, communication of the TMGI for multicast operation and session management and media negotiation.

The reference point SIP-2 (between the SIP core and the SIP AS): The SIP-2 reference point, which exists between the SIP core and the SIP AS for establishing a session in support of MC Data, shall use the ISC and Ma reference points as defined in 3GPP TS 23.002 [3]. The SIP-2 reference point is used for sending notification to the MC Data server 104 of SIP registration by the first MC Data UE 102*a*, authentication and security to the service layer; MC Data user or application data, disposition request and notification, communication of the TMGI for multicast operation and session management and media negotiation.

The reference point SIP-3 (between the SIP core and SIP core): The SIP-3 reference point, which exists between one SIP core and another SIP core for establishing a session in support of MC Data, shall use the Mm and IC i reference points as defined in 3GPP TS 23.002 [3]. The SIP-3 reference point is used for MC Data user or application data, disposition request and notification and session management and media negotiation.

The reference point AAA-1 (between the SIP database and the SIP core): The AAA-1 reference point, which exists between the SIP database and the SIP core, is used by the SIP core to retrieve signalling plane data from the SIP database. The AAA-1 reference point utilizes the Cx reference point as defined in 3GPP TS 23.002 [3]. In some deployment scenarios the registrar and SIP database are located in the MC Data service provider's network while the registrar finder is in the PLMN operator's network and the AAA-1 reference point is an inter-network interface.

Figure 4:
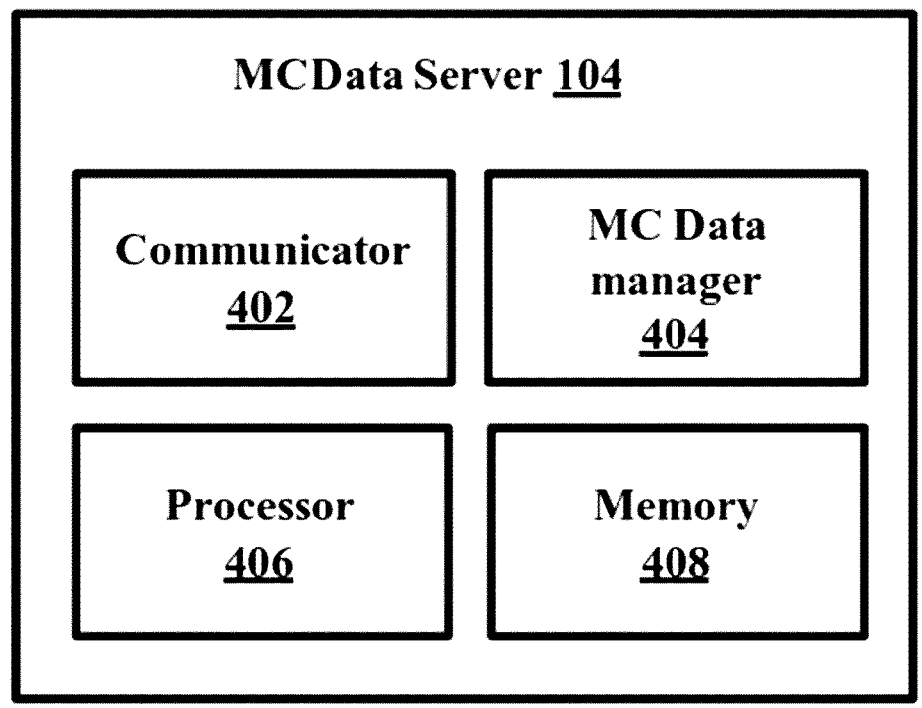
FIG. 4 is a block diagram illustrating various hardware components of the MC Data Server, according to an embodiment as disclosed herein.

FIG. 4 is a block diagram illustrating various components of the MC Data Server 104, according to an embodiment as disclosed herein. The MC Data server 104 represents a specific instantiation of the GCS AS described in 3GPP TS 23.468 to control multicast and unicast operations for group communications. The MC Data server 104 is supported by the SIP AS of the signalling control plane.

Referring to the FIG. 4, the MC Data Server 104 can include a communicator 402, a MC Data manager 404, a processor 406 and a memory 408.

In an embodiment, the communicator 402 can be configured to receive the MC Data request message from the first MC Data UE 102*a* and transmit the MC Data request message to the second MC Data UE 102*b* in case of one-to-one MC Data communication. Further, the communicator 402 can also be configured to receive the MC Data disposition notification message from the second MC Data UE 102*b* based on an information element enabled in the MC Data request message and transmit the MC Data disposition notification to the first MC Data UE 102*a*. The information element enabled in the MC Data request message can be one of a conversation identifier, a payload destination type, a disposition type and a transaction type.

In another embodiment, the communicator 402 can be configured to receive the MC Data request message from the first MC Data UE 102*a* and transmit the MC Data request message to a group of second MC Data UEs 102*b*-102*n* in case of group MC Data communication. Further, the communicator 402 can also be configured to receive the MC Data disposition notification messages from the group of second MC Data UEs 102*b*-102*n* based on the information element enabled in the MC Data request message and transmit the MC Data disposition notification (or an aggregated notification) to the first MC Data UE 102*a*. The information element enabled in the MC Data request message can be one of the conversation identifier, the payload destination type, the disposition type and the transaction type.

In an embodiment, the MC Data manager 404 can be configured to authorize the MC Data UEs 102*a*-102*n* to participate in the MC Data communication. The MC DataUEs 102*a*-102*n* is registered with the MC Data server 104 for receiving MC Data service for one-to-one and group data communication. The MC Data manager 404 authorizes the MC Data UEs 102*a*-102*n* based on their registration with the MC Data server 104 for receiving MC Data service.

The MC Data manager 404 can also be configured to determine whether any policy is to be asserted to limit certain types of message or content to certain MC Data UEs due to location or user privilege or affiliation; and further determine the eligible MC Data UE (s) after policy assertion.

The MC Data manager 404 coordinates with a group management server 108 to resolve the group identifier (MC Data group ID) associated with the group of second MC Data UEs 102*b*-102*n* for group MC Data communication. Further, the MC Data manager 404 determines the affiliation status of the second MC Data UEs 102*b*-102*n* based on the information received from the group management server 108.

The MC Data manager 404 is also configured to aggregate the MC Data disposition notification messages received from the second MC Data UEs 102*b*-102*n* for delivery of the payload and read data, in case of group communication.

In an embodiment, the processor 406 (for example; a hardware unit, an apparatus, a Central Processing Unit (CPU), a Graphics Processing Unit (GPU), etc.,) communicatively coupled to a memory 408 (e.g., a volatile memory and/or a non-volatile memory); the memory 408 includes storage locations configured to be addressable through the processor 406.

In an embodiment, the memory 408 can be configured to store the MC Data disposition notification messages received from the second MC Data UEs 102*b*-102*n* for disposition history interrogation from authorized MC Data UEs. The memory 408 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 408 may, in some examples, be considered a non-transitory storage medium. The term "non-transitory" may indicate that the storage medium is not embodied in a carrier wave or a propagated signal. However, the term "non-transitory" should not be interpreted that the memory 408 is non-movable. In some examples, the memory 408 can be configured to store larger amounts of information than the memory. In certain examples, a non-transitory storage medium may store data that can, over time, change (e.g., in Random Access Memory (RAM) or cache).

Figure 5:
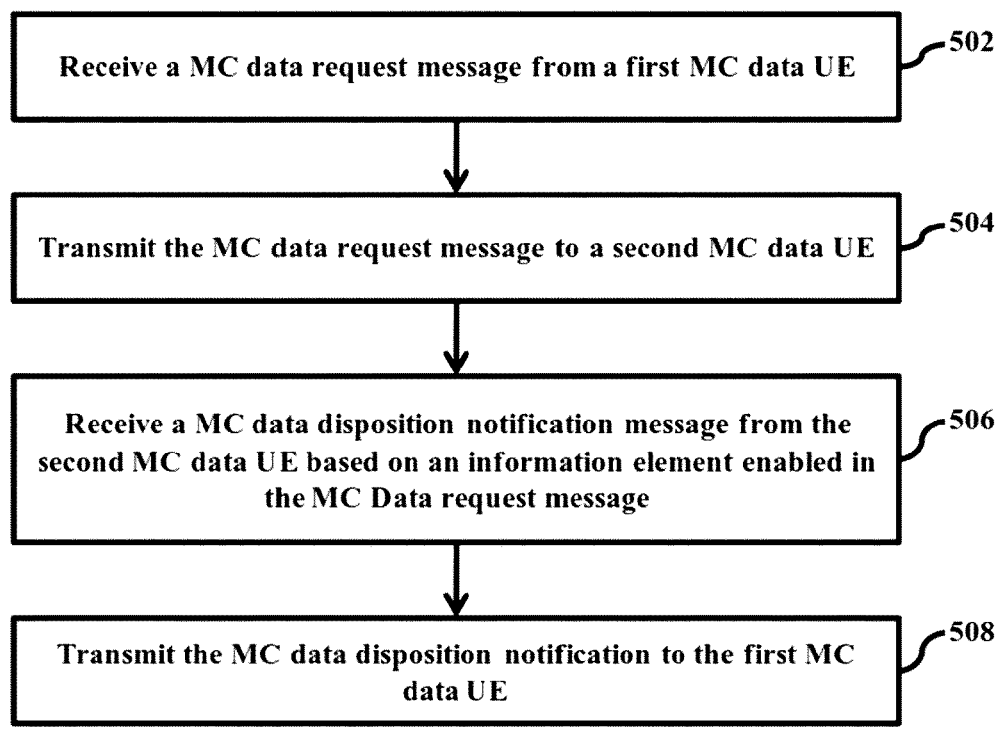
FIG. 5 is a flow diagram illustrating a method for managing one-to-one SDS in the on-network MC Data communication system, according to an embodiment as disclosed herein.

FIG. 5 is a flow diagram illustrating a method for managing one-to-one SDS in the MC Data communication system, according to an embodiment as disclosed herein.

Referring to the FIG. 5, at step 502, the MC Data server 104 receives the MC Data request message from the first MC Data UE 102*a*. For example, in the MC Data server 104 as illustrated in the FIG. 4, the communicator 402 can be configured to receive the MC Data request message from the first MC Data UE 102*a*.

At step 504, the MC Data server 104 transmits the MC Data request message to the second MC Data UE 102*b*. For example, in the MC Data server 104 as illustrated in the FIG. 4, the communicator 402 can be configured to transmit the MC Data request message to the second MC Data UE 102*b*.

At step 506, the MC Data server 104 receives a MC Data disposition notification message from the second MC Data UE 102*b* based on an information element enabled in the MC Data request message. For example, in the MC Data server 104 as illustrated in the FIG. 4, the communicator 402 can be configured to receive the MC Data disposition notification message from the second MC Data UE 102*b* based on an information element enabled in the MC Data request message.

At step 508, the MC Data server 104 transmits the MC Data disposition notification to the first MC Data UE 102*a*. For example, in the MC Data server 104 as illustrated in the FIG. 4, the communicator 402 can be configured to transmit the MC Data disposition notification to the first MC Data UE 102*a*.

Figure 6:
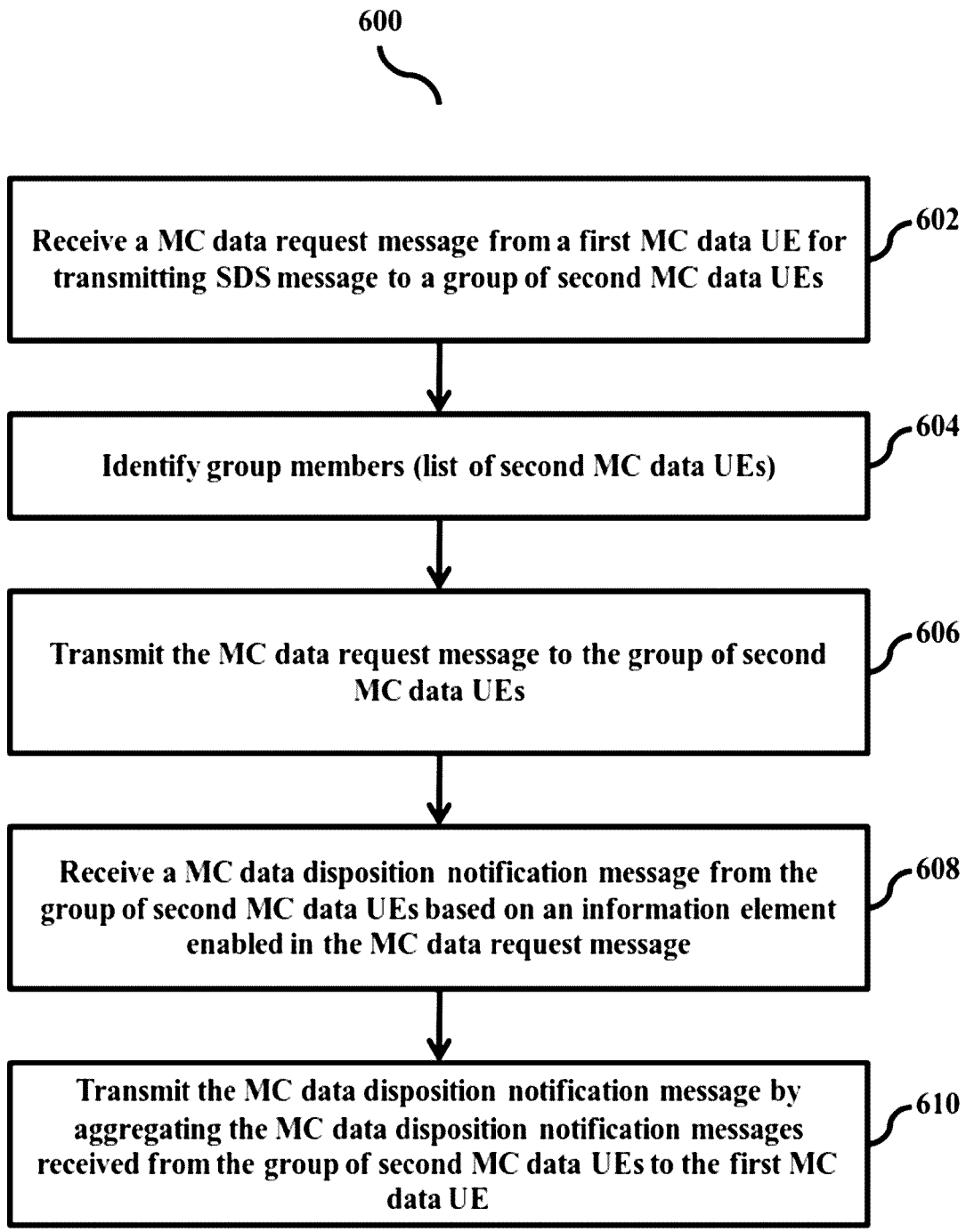
FIG. 6 is a flow diagram illustrating a method for managing group SDS in the on-network MC Data communication system, according to an embodiment as disclosed herein.

FIG. 6 is a flow diagram illustrating a method for managing group SDS in MC Data communication system, according to an embodiment as disclosed herein.

Referring to the FIG. 6, at step 602, the MC Data server 104 receives a MC Data request message from the first MC Data UE 102*a* for transmitting SDS message to a group of second MC Data UEs 102*b*-102*n*. For example, in the MC Data server 104 as illustrated in the FIG. 4, the communicator 402 can be configured to receive the MC Data request message from the first MC Data UE 102*a* for transmitting the SDS message to a group of second MC Data UEs 102*b*-102*n*.

At step 604, the MC Data server 104 identifies the group members (list of second MC Data UEs 102*b*-102*n*). For example, in the MC Data server 104 as illustrated in the FIG. 4, the MC Data manager 404 can be configured to identify a group identifier associated with the group of second MC Data UEs 102*b*-102*n*.

At step 606, the MC Data server 104 transmits the MC Data request message to the group of second MC Data UEs 102*b*-102*n*. For example, in the MC Data server 104 as illustrated in the FIG. 4, the communicator 402 can be configured to transmit the MC Data request message to the group of second MC Data UEs 102*b*-102*n*.

At step 608, the MC Data server 104 receives a MC Data disposition notification message from the group of second MC Data UEs 102*b*-102*n* based on an information element enabled in the MC Data request message. For example, in the MC Data server 104 as illustrated in the FIG. 4, the communicator 402 can be configured to receive a MC Data disposition notification message from the group of second MC Data UEs 102*b*-102*n* based on an information element enabled in the MC Data request message.

At step 610, the MC Data server 104 transmits the MC Data disposition notification message by aggregating the MC Data disposition notification messages received from the group of second MC Data UEs 102b-102n to the first MC Data UE 102a. For example, in the MC Data server 104 as illustrated in the FIG. 4, the communicator 402 can be configured to transmit the MC Data disposition notification message by aggregating the MC Data disposition notification messages received from the group of second MC Data UEs 102b-102n to the first MC Data UE 102a.

Figure 7:
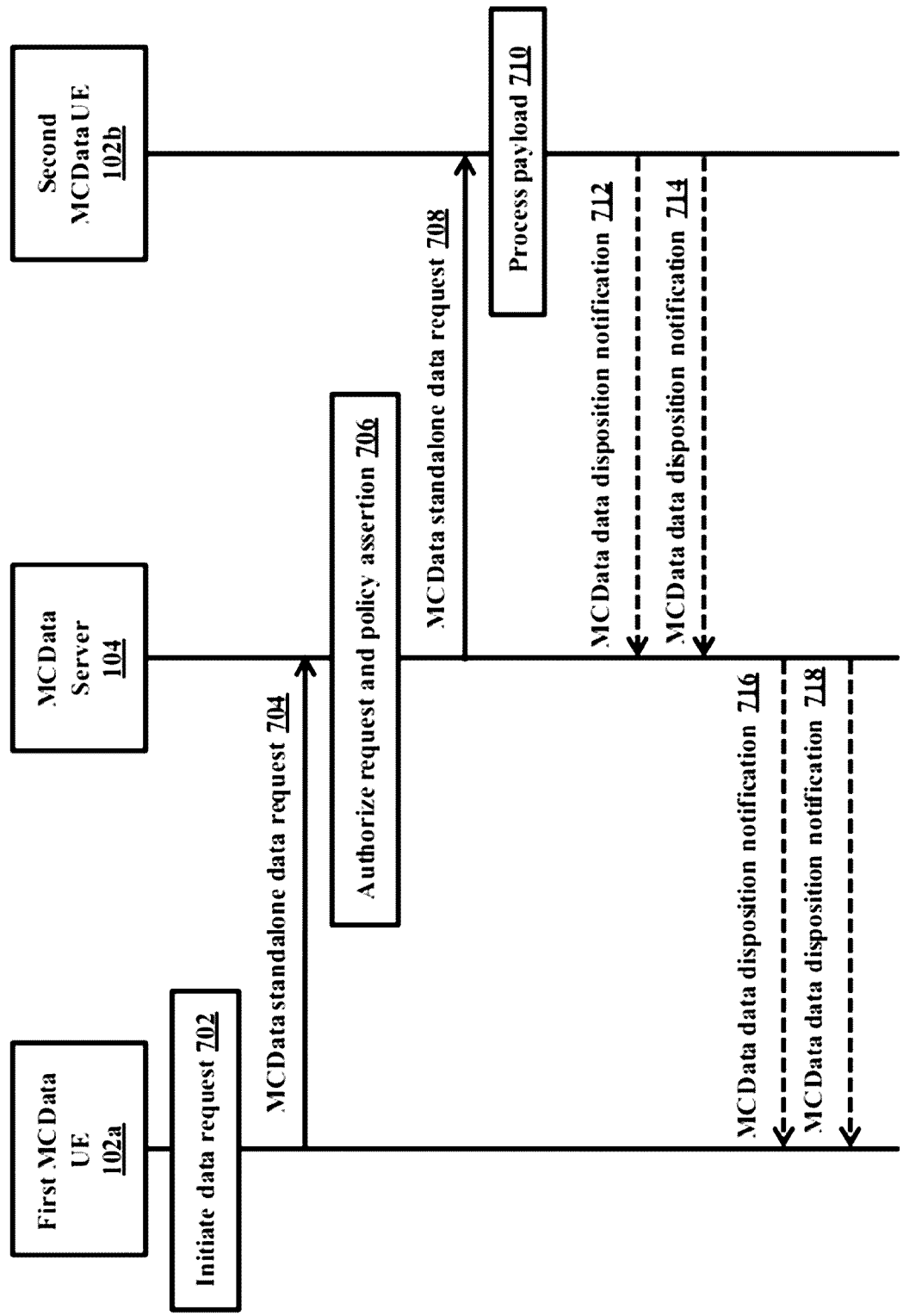
FIG. 7 is a sequence diagram illustrating various signaling messages communicated between a first MC Data UE, the MC Data server and a second MC Data UE for a one-to-one standalone SDS using the signaling control plane, according to an embodiment as disclosed herein.

FIG. 7 is a sequence diagram illustrating various signalling messages communicated between a first MC Data UE, the MC Data server and a second MC Data UE for a one-to-one standalone SDS using the signaling control plane, according to an embodiment as disclosed herein.

Referring to FIG. 7, the first MC Data UE 102a initiates a one-to-one MC Data communication for sending standalone SDS data to the second MC Data UE 102b, with or without disposition request. A standalone data service refers to sending unidirectional data in one transaction. The SDS data size is assumed to be within the allowed limits over MC Data-SDS-1 using SIP reference points. Further, it is assumed that the first MC Data UE 102a and the second MC Data UE 102b have already registered with the MC Data server 104 for receiving MC Data service and also that the first MC Data UE 102a and the second MC Data UE 102b belong to the same MC Data system 100.

At step 702, the first MC Data UE 102a initiates SDS data transfer request to the second MC Data UE 102b.

At step 704, the first MC Data UE 102a sends a MC Data standalone data request message to the MC Data server 104. The MC Data standalone data request includes information elements such as a conversation identifier, a payload destination type, a disposition type and a transaction type as the information elements. The MC Data standalone data request message may contain disposition request as the information element if enabled by the first MC Data UE 102a.

At step 706, the MC Data server 104 receives the MC Data standalone data request message sent by the first MC Data UE 102a and determines whether the first MC Data UE 102a is authorized to send MC Data standalone data request message. Further, the MC Data server 104 also determines whether any policy is to be asserted to limit certain types of message or content to certain MC Data UEs due, for example, to location or user privilege or affiliation.

At step 708, on determining that the first MC Data UE 102a is authorized to send MC Data standalone data request, the MC Data server 104 sends the MC Data standalone data request message with data to the second MC Data UE 102b on the signaling control plane over the MC Data-SDS-1.

At step 710, the second MC Data UE 102b determines whether the payload is for MC Data user consumption. On determining that the payload is for MC Data user consumption, the second MC Data UE 102b is configured to notify the first MC Data UE 102a. The action taken when the payload contains the application data or the command instructions are based on the contents of the payload. The payload content received by the second MC Data UE 102b which is addressed to a known local non-MC Data application that is not yet running shall cause the second MC Data UE 102b to start the local non-MC Data application (i.e., remote start application) and shall pass the payload content to the local non-MC Data application.

At step 712, the second MC Data UE 102b determines whether the MC Data disposition notification message for delivery of the payload was requested by the first MC Data UE 102a. The second MC Data UE 102b determines whether the MC Data disposition notification message for delivery of the payload was requested by the first MC Data UE 102a by determining whether the information element related to the disposition type is enabled in the MC Data standalone request message. On determining that the MC Data disposition notification message has been requested by the first MC Data UE 102a, the second MC Data UE 102b initiates the MC Data disposition notification for delivery report to the MC Data server 104. Further, the MC Data server 104 stores the MC Data disposition notification from the second MC Data UE 102b for disposition history interrogation from authorized MC Data UEs.

At step 714, the second MC Data UE 102b determines whether the MC Data disposition notification message for read was requested by the first MC Data UE 102a. On determining that the MC Data disposition notification message for read has been requested by the first MC Data UE 102a, the second MC Data UE 102b sends the MC Data disposition notification for read report to the MC Data server 104, after the receiving user of the second MC Data UE 102b has read the data. Further, the MC Data server 104 stores the MC Data disposition notification from the second MC Data UE 102b for disposition history interrogation from authorized MC Data UEs.

At step 716 and step 718, the MC Data server 104 sends the MC Data disposition notification messages for a delivery report and for a read report respectively, to the first MC Data UE 102a as shown in the FIG. 7.

Figure 8:
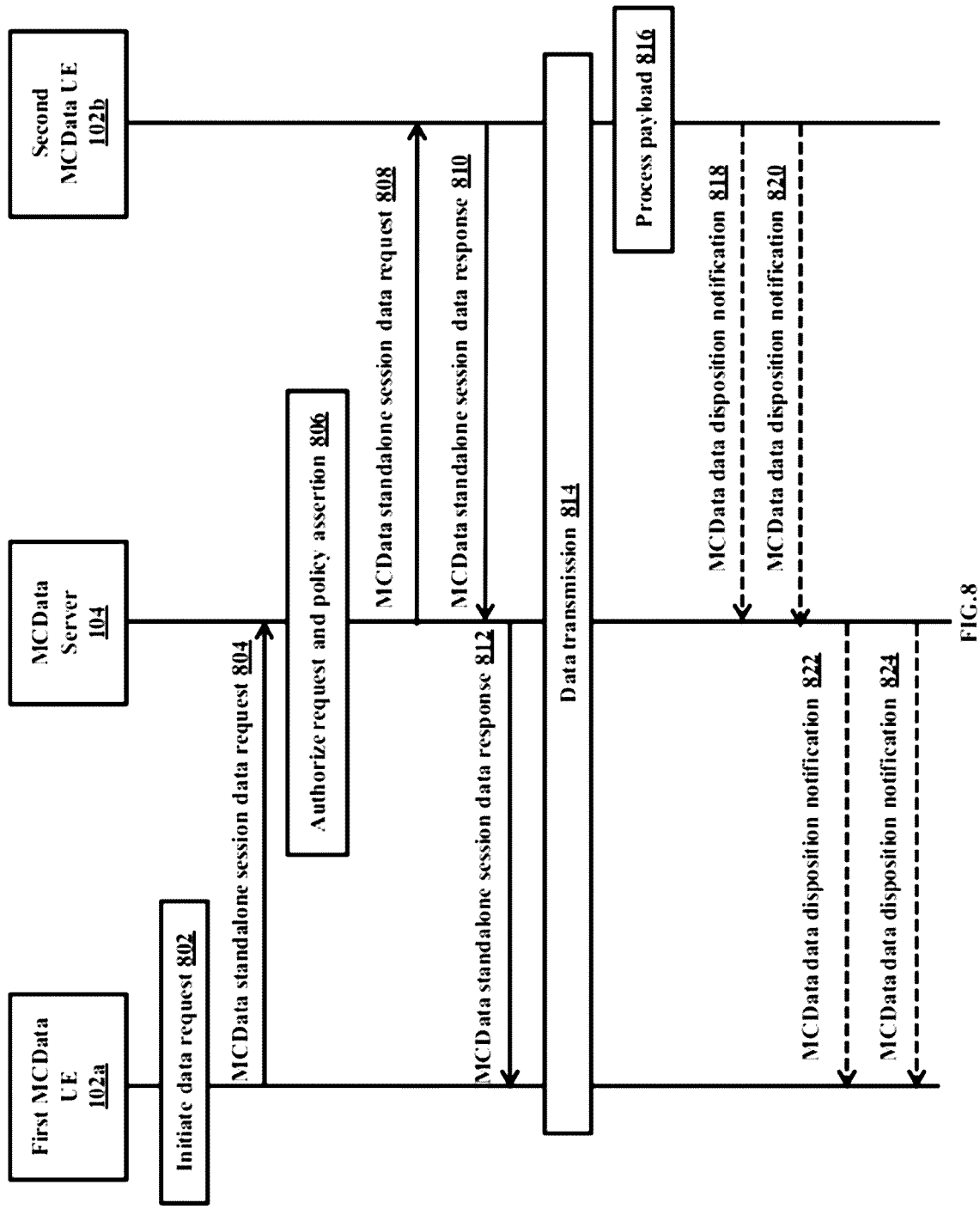
FIG. 8 is a sequence diagram illustrating various signaling messages communicated between the first MC Data UE, the MC Data server and the second MC Data UE for a one-to-one standalone SDS using the media plane, according to an embodiment as disclosed herein.

FIG. 8 is a sequence diagram illustrating various signalling messages communicated between the first MC Data UE, the MC Data server and the second MC Data UE for a one-to-one standalone SDS using the media plane, according to an embodiment as disclosed herein.

Referring to FIG. 8, the first MC Data UE 102a initiates a one-to-one MC Data communication for sending standalone session SDS data to the second MC Data UE 102b, with or without disposition request. A standalone data service refers to sending unidirectional data in one transaction. Further, it is assumed that the first MC Data UE 102a and the second MC Data UE 102b have already registered with the MC Data server 104 for receiving MC Data service and also that the first MC Data UE 102a and the second MC Data UE 102b belong to the same MC Data system 100.

At step 802, the first MC Data UE 102a initiates SDS data transfer request to the second MC Data UE 102b. At step 804, the first MC Data UE 102a sends a MC Data standalone session data request message to the MC Data server 104. The MC Data standalone session data request message includes information elements such as a conversation identifier, a payload destination type, a disposition type and a transaction type as the information elements. The MC Data standalone session data request message may contain disposition request if enabled by the first MC Data UE 102a.

At step 806, the MC Data server 104 receives the MC Data standalone session data request message sent by the first MC Data UE 102a and determines whether the first MC Data UE 102a is authorized to send MC Data standalone session data request message. Further, the MC Data server 104 also determines whether any policy is to be asserted to limit certain types of message or content to certain MC Data UEs due, for example, to location or user privilege or affiliation. Further, the MC Data server 104 determines the eligible MC Data UE (s) after policy assertion for sending the MC Data standalone session data request message.

At step 808, on determining that the first MC Data UE 102a is authorized to send MC Data standalone session data request message, the MC Data server 104 sends the MC Data standalone session data request message with data to the second MC Data UE 102*b* using the media plane over MC Data-SDS-2.

At step 810, on receiving the MC Data standalone session data request message, the second MC Data UE 102*b* automatically accepts the MC Data standalone session data request and responds by sending a MC Data standalone session data response message to the MC Data server 104.

At step 812, on receiving the MC Data standalone session data response message from the second MC Data UE 102*b*, the MC Data server 104 forwards the MC Data standalone session data response message to the first MC Data UE 102*a*.

At step 814, the first MC Data UE 102*a* and the second MC Data UE 102*b* have successfully established the media plane for data communication and the first MC Data UE 102*a* transmits the SDS data over the media plane to the second MC Data UE 102*b*.

At step 816, the second MC Data UE 102*b* determines whether the payload is for MC Data user consumption. On determining that the payload is for MC Data user consumption, the second MC Data UE 102*b* is configured to notify the first MC Data UE 102*a*. The action taken when the payload contains the application data or the command instructions are based on the contents of the payload. The payload content received by the second MC Data UE 102*b* which is addressed to the known local non-MC Data application that is not yet running shall cause the second MC Data UE 102*b* to start the local non-MC Data application (i.e., remote start application) and shall pass the payload content to the local non-MC Data application.

At step 818, the second MC Data UE 102*b* determines whether the MC Data disposition notification message for delivery of the payload was requested by the first MC Data UE 102*a*. The second MC Data UE 102*b* determines whether the MC Data disposition notification message for delivery of the payload was requested by the first MC Data UE 102*a* by determining whether the information element related to the disposition type is enabled in the MC Data standalone session data request message. On determining that the MC Data disposition notification message has been requested by the first MC Data UE 102*a*, the second MC Data UE 102*b* initiates the MC Data disposition notification message for delivery report to the MC Data server 104. Further, the MC Data server 104 stores the MC Data disposition notification message from the second MC Data UE 102*b* for disposition history interrogation from authorized MC Data UEs.

At step 820, the second MC Data UE 102*b* determines whether the MC Data disposition notification message for read was requested by the first MC Data UE 102*a*. On determining that the MC Data disposition notification message for read has been requested by the first MC Data UE 102*a*, the second MC Data UE 102*b* sends the MC Data disposition notification for read report to the MC Data server 104, after the receiving user of the second MC Data UE 102*b* reads the data. Further, the MC Data server 104 stores the MC Data disposition notification from the second MC Data UE 102*b* for disposition history interrogation from authorized MC Data UEs.

At step 822 and step 824, the MC Data server 104 sends the MC Data disposition notification messages for delivery report and for read report respectively, to the first MC Data UE 102*a*.

Figure 9:
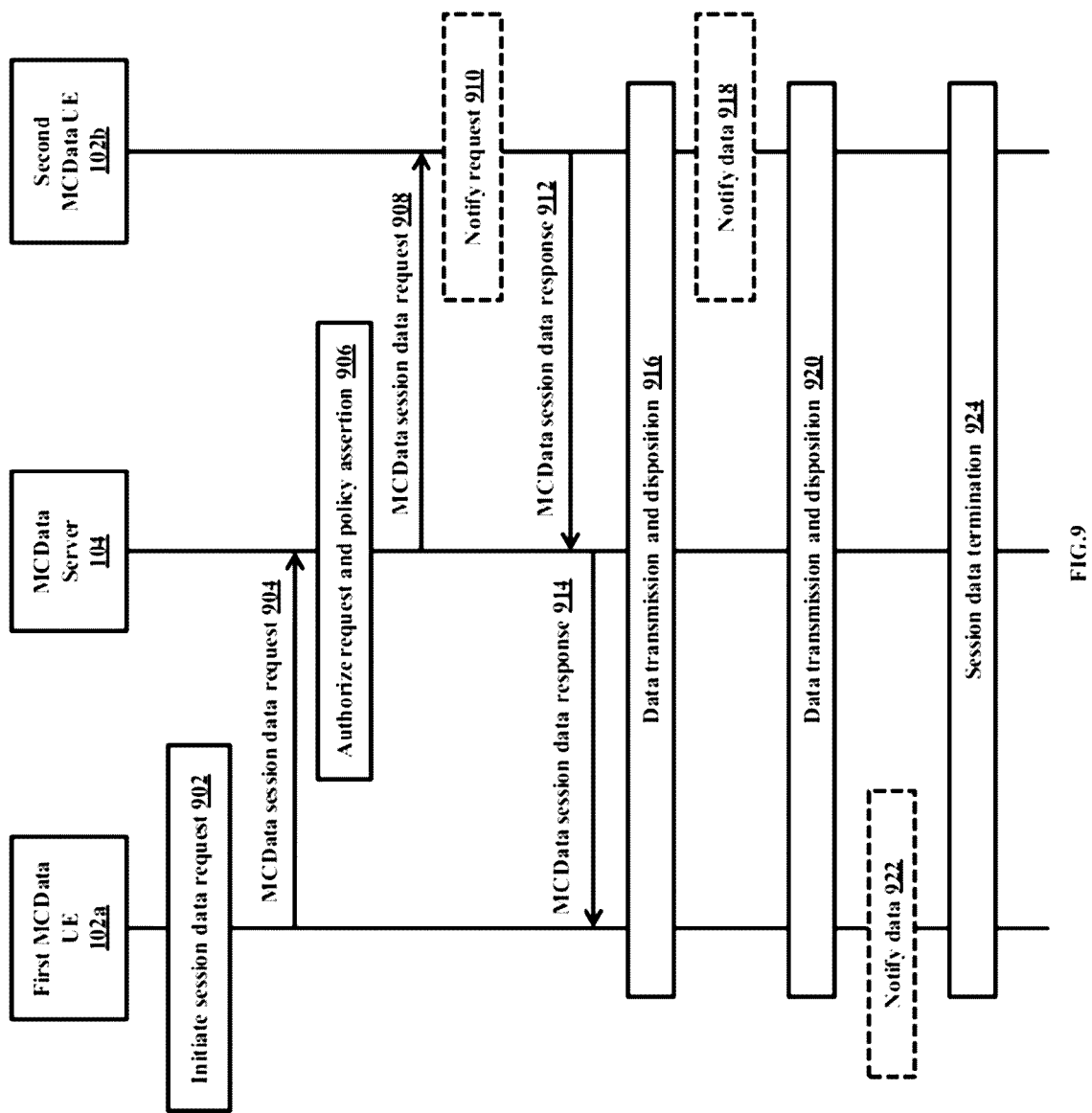
FIG. 9 is a sequence diagram illustrating various signalling messages communicated between the first MC Data UE, the MC Data server and the second MC Data UE for a bidirectional one-to-one SDS session for exchanging data using the media plane, according to an embodiment as disclosed herein.

FIG. 9 is a sequence diagram illustrating various signalling messages communicated between the first MC Data UE, the MC Data server and the second MC Data UE for a bidirectional one-to-one SDS session for exchanging data using the media plane, according to an embodiment as disclosed herein.

Referring to FIG. 9, the first MC Data UE 102*a* initiates a one-to-one MC Data communication session with the second MC Data UE 102*b* for exchanging at least one SDS data transaction between them, with or without disposition request using MC Data-SDS-1 and MC Data-SDS-2 or MC Data-SDS-3 reference points. Further, it is assumed that the first MC Data UE 102*a* and the second MC Data UE 102*b* have already registered with the MC Data server 104 for receiving MC Data service and also that the first MC Data UE 102*a* and the second MC Data UE 102*b* belong to the same MC Data system 100.

At step 902, the first MC Data UE 102*a* initiates a SDS data communication session request to the second MC Data UE 102*b*.

At step 904, the first MC Data UE 102*a* sends a MC Data session data request message to the MC Data server 104. The MC Data session data request message contains the identifier for transmitting a plurality of SDS messages to the second MC Data UE 102*b*.

At step 906, the MC Data server 104 receives the MC Data session data request message sent by the first MC Data UE 102*a* and determines whether the first MC Data UE 102*a* is authorized to send MC Data session data request message. Further, the MC Data server 104 also determines whether any policy is to be asserted to limit certain types of message or content to certain MC Data UEs due, for example, to location or user privilege or affiliation. Further, the MC Data server 104 determines the eligible MC Data UE (s) after policy assertion for sending the MC Data standalone session data request.

At step 908, on determining that the first MC Data UE 102*a* is authorized to send MC Data session data request message, the MC Data server 104 sends the MC Data session data request message with data to the second MC Data UE 102*b*.

At step 910, the second MC Data UE 102*b* optionally notifies the user about the incoming MC Data session data request message.

Further, at step 912, the second MC Data UE 102*b* accepts the MC Data session data request message and responds by sending a MC Data session data response message to MC Data server 104.

At step 914, the MC Data server 104 forwards the MC Data session data response message received from the second MC Data UE 102*b* to the first MC Data UE 102*a*.

At steps 916 and 920, the first MC Data UE 102*a* and the second MC Data UE 102*b* have successfully established the media plane for data communication and the either the first MC Data UE 102*a* or the second MC Data UE 102*b* can transmit the SDS data. The MC Data session data request message may contain disposition request if indicated by the MC Data UE sending the data. If MC Data disposition was requested by either of the MC Data UEs, then the receiving MC Data UE initiates the MC Data disposition notification message for delivery, read reports to the disposition requesting MC Data UE. The MC Data server 104 stores the MC Data disposition notification from the second MC Data UE 102*b* for disposition history interrogation from authorized MC Data UEs.

At steps 918 and 922, if the payload is for MC Data user consumption (e.g. is not application data, is not command instructions, etc.) then the second MC Data UE 102*b* is notified.

At step 924, the first MC Data UE 102a and the second MC Data UE 102b releases the established media plane after SDS data transaction between the first MC Data UE 102a and the second MC Data UE 102b is complete.

Figure 10:
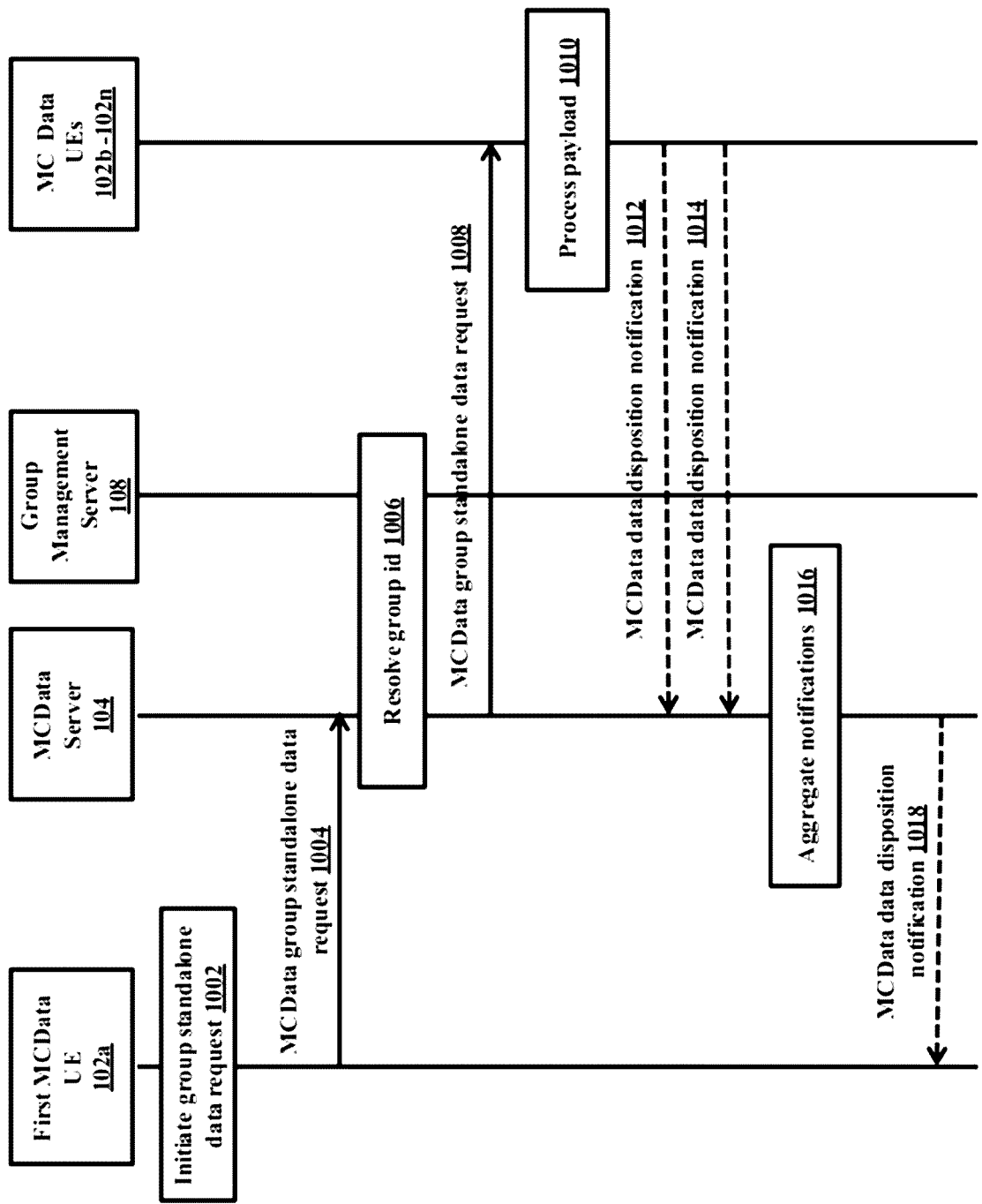
FIG. 10 is a sequence diagram illustrating various signalling messages communicated between the first MC Data UE, the MC Data server and a group of second MC Data UEs for a unidirectional group standalone SDS using the signaling control plane, according to an embodiment as disclosed herein.

FIG. 10 is a sequence diagram illustrating various signalling messages communicated between the first MC Data UE, the MC Data server and a group of second MC Data UEs 102b-102n for a unidirectional group standalone SDS using the signaling control plane, according to an embodiment as disclosed herein.

Referring to FIG. 10, a group standalone SDS is initiated to a selected group of MC Data UEs 102b-102n which results in affiliated group members receiving the SDS data. The SDS data size is assumed to be within the allowed limits over MC Data-SDS-1 using SIP reference points. The first MC Data UE 102a is initiating the group standalone MC Data communication with or without disposition request, to a group of second MC Data UEs 102b-102n. Further, it is assumed that the group of second MC Data 102b-102n belong to the same group and are already registered for receiving MC Data service and affiliated.

At step 1002, the first MC Data UE 102a initiates group standalone SDS data transfer request to MC Data UEs 102b-102n by selecting a pre-configured group (identified by a group identifier associated with the group of second MC Data UEs 102b-102n) and optionally particular members from that group of second MC Data UEs 102b-102n.

At step 1004, the first MC Data UE 102a sends a MC Data group standalone data request message to the MC Data server 104. The MC Data group standalone data request message contains target recipient(s) as selected by the first MC Data UE 102a. Further, the MC Data group standalone data request message also contains the conversation identifier, the payload destination type, the disposition type and the transaction type as the information elements. The conversation identifier in the MC Data group standalone data request message represents a message thread. The MC Data group standalone data request message may contain disposition request if indicated by the user at the first MC Data UE 102a.

At step 1006, the MC Data server 104 receives the MC Data group standalone data request message sent by the first MC Data UE 102a and determines whether the first MC Data UE 102a is authorized to send MC Data group standalone data request message. Further, the MC Data server 104 resolves the group identifier associated with the group of second MC Data UEs 102b-102n to determine the group of second MC Data UEs 102b-102n and their affiliation status, based on the information received from the group management server 108. The MC Data server 104 also determines whether any policy is to be asserted to limit certain types of message or content to certain members due, for example, to location or user privilege or affiliation.

At step 1008, the MC Data server 104 sends the MC Data group standalone data request message received from the first MC Data UE 102a to each of the second MC Data UEs 102b-102n.

At step 1010, if the payload is for MC Data user consumption (e.g. is not application data, is not command instructions, etc.) then the group of second MC Data UEs 102b-102n will be notified. The action taken when the payload contains application data or command instructions are specific based on the contents of the payload. Payload content received by the second MC Data UE 102b which is addressed to a known local non-MC Data application that is not yet running shall cause the second MC Data UE 102b to start the local non-MC Data application (i.e., remote start application) and shall pass the payload content to the local non-MC Data application.

At step 1012, the group of second MC Data UEs 102b-102n determines whether the MC Data disposition notification message for delivery of the payload was requested by the first MC Data UE 102a. The MC Data UEs 102b-102n determines whether the MC Data disposition notification message for delivery of the payload was requested by the first MC Data UE 102a by determining whether the information element related to the disposition type is enabled in the MC Data group standalone request message. On determining that the MC Data disposition notification message has been requested by the first MC Data UE 102a, the group of second MC Data UEs 102b-102n send the MC Data disposition notification message for delivery report to the MC Data server 104. Further, the MC Data server 104 stores the MC Data disposition notification messages from the group of second MC Data UEs 102b-102n for disposition history interrogation from authorized MC Data UEs.

At step 1014, the MC Data UEs 102b-102n determines whether the MC Data disposition notification message for read was requested by the first MC Data UE 102a. On determining that the MC Data disposition notification message for read has been requested by the first MC Data UE 102a, the group of second MC Data UEs 102b-102n send the MC Data disposition notification message for read report to the MC Data server 104, after the receiving users of the group of MC Data UEs 102b-102n have read the data. Further, the MC Data server 104 stores the MC Data disposition notification messages from the MC Data UEs 102b-102n for disposition history interrogation from authorized MC Data UEs.

At step 1016, the MC Data server 104 aggregates the MC Data disposition notification message(s) from each of the MC Data UEs 102b-102n.

Further, at step 1018, the MC Data server 104 sends the aggregated or individual MC Data disposition notification message (s) from MC Data UEs 102b-102n to the first MC Data UE 102a.

Figure 11:
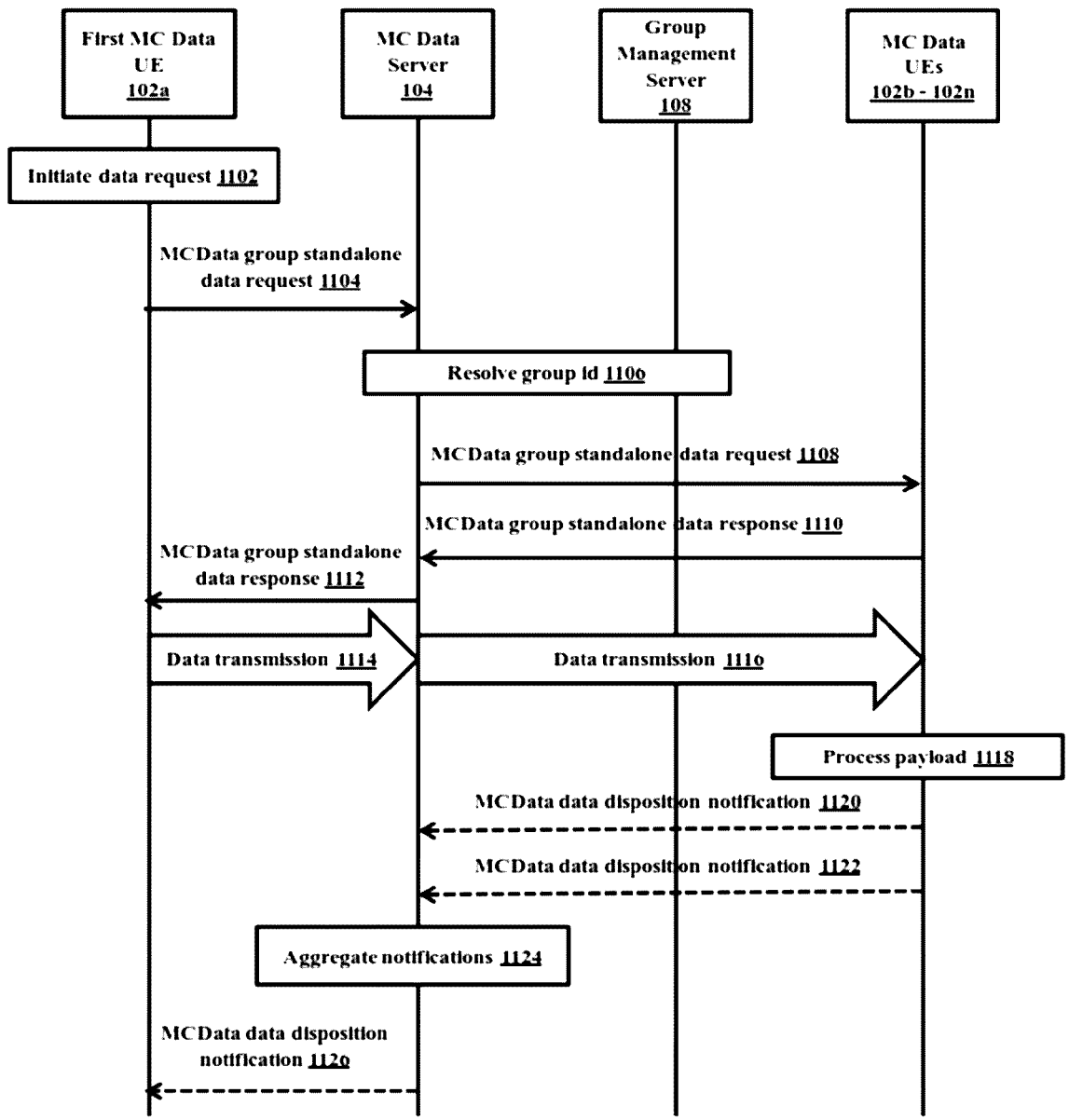
FIG. 11 is a sequence diagram illustrating various signalling messages communicated between the first MC Data UE, the MC Data server and the group of second MC Data UEs for a unidirectional group standalone SDS using the media plane, according to an embodiment as disclosed herein.

FIG. 11 is a sequence diagram illustrating various signalling messages communicated between the first MC Data UE, the MC Data server and the group of second MC Data UEs 102b-102n for a unidirectional group standalone SDS using the media plane, according to an embodiment as disclosed herein.

Referring to FIG. 11, the group standalone SDS is initiated to a selected group of MC Data UEs 102b-102n which results in affiliated group members receiving the SDS data. The first MC Data UE 102a is initiating the group standalone MC Data communication with or without disposition request, to a group of second MC Data UEs 102b-102n. Further, it is assumed that the MC Data UEs 1 to n 102a-102n belong to the same group and are already registered for receiving MC Data service and affiliated.

At step 1102, the first MC Data UE 102a initiates group standalone SDS data transfer request to MC Data UEs 102b-102n by selecting a pre-configured group (identified by a group identifier associated with the group of second MC Data UEs 102b-102n) and optionally particular members from that group of second MC Data UEs 102b-102n.

At step 1104, the first MC Data UE 102a sends a MC Data group standalone data request message to the MC Data server 104. The MC Data group standalone data request message contains target recipient(s) as selected by the first MC Data UE 102a. Further, the MC Data group standalone data request message also contains the conversation identifier, the payload destination type, the disposition type and the transaction type as the information elements. The conversation identifier in the MC Data group standalone data request message represents a message thread. The MC Data group standalone data request message may contain disposition request if indicated by the user at the first MC Data UE 102*a*.

At step 1106, the MC Data server 104 receives the MC Data group standalone data request message sent by the first MC Data UE 102*a* and determines whether the first MC Data UE 102*a* is authorized to send MC Data group standalone data request message. Further, the MC Data server 104 resolves the group identifier associated with the group of second MC Data UEs 102*b*-102*n* to determine the group of second MC Data UEs 102*b*-102*n* and their affiliation status, based on the information received from the group management server 108. The MC Data server 104 also determines whether any policy is to be asserted to limit certain types of message or content to certain members due, for example, to location or user privilege or affiliation.

At step 1108, the MC Data server 104 sends the MC Data group standalone data request message received from the first MC Data UE 102*a* to each of the MC Data UEs 102*b*-102*n*.

At step 1110, on receiving the MC Data group standalone data request message, the MC Data UEs 102*b*-102*n* automatically accepts the MC Data group standalone data request message and responds by sending a MC Data group standalone data response message to the MC Data server 104.

At step 1112, on receiving the MC Data group standalone data response message from the MC Data UEs 102*b*-102*n*, the MC Data server 104 forwards the MC Data group standalone data response message to the first MC Data UE 102*a*.

At step 1114, the first MC Data UE 102*a* and the MC Data server 104 have successfully established the media plane for data communication and the first MC Data UE 102*a* transmits the SDS data over the media plane to the MC Data server 104.

At step 1116, the MC Data server 104 sends the SDS data received from the first MC Data UE 102*a* to the MC Data UEs 102*b*-102*n* over the media plane. After completion of transfer of the SDS data from the first MC Data UE 102*a* to the MC Data UEs 102*b*-102*n*, media plane resources associated to the data communication are released.

At step 1118, the MC Data UEs 102*b*-102*n* determine whether the payload is for MC Data user consumption. On determining that the payload is for MC Data user consumption, the MC Data UEs 102*b*-102*n* are configured to notify the first MC Data UE 102*a*. The action taken when the payload contains the application data or the command instructions are based on the contents of the payload. The payload content received by the MC Data UEs 102*b*-102*n* which are addressed to the known local non-MC Data application that is not yet running shall cause the MC Data UEs 102*b*-102*n* to start the local non-MC Data application (i.e., remote start application) and shall pass the payload content to the local non-MC Data application.

At step 1120, the MC Data UEs 102*b*-102*n* determine whether the MC Data disposition notification message for delivery of the payload was requested by the first MC Data UE 102*a*. The MC Data UEs 102*b*-102*n* determine whether the MC Data disposition notification message for delivery of the payload was requested by the first MC Data UE 102*a* by checking if the information element related to the disposition type is enabled in the MC Data group standalone data request message. On determining that the MC Data disposition notification message has been requested by the first MC Data UE 102*a*, the MC Data UEs 102*b*-102*n* initiate the MC Data disposition notification message for delivery report to the MC Data server 104. Further, the MC Data server 104 stores the MC Data disposition notification messages from the group of second MC Data UEs 102*b*-102*n* for disposition history interrogation from authorized MC Data UEs.

At step 1122, the group of second MC Data UEs 102*b*-102*n* determines whether the MC Data disposition notification message for read was requested by the first MC Data UE 102*a*. On determining that the MC Data disposition notification message for read has been requested by the first MC Data UE 102*a*, the MC Data UEs 102*b*-102*n* send the MC Data disposition notification for read report to the MC Data server 104, after the receiving users of the MC Data UEs 102*b*-102*n* have read the data. Further, the MC Data server 104 stores the MC Data disposition notification messages from the MC Data UEs 102*b*-102*n* for disposition history interrogation from authorized MC Data UEs.

At step 1124, the MC Data server 104 aggregates the MC Data disposition notification message (s) from each of the MC Data UEs 102*b*-102*n*.

Further, at step 1126, the MC Data server 104 sends the aggregated or individual MC Data disposition notification message(s) from the MC Data UEs 102*b*-102*n* to the first MC Data UE 102*a*.

Figure 12:
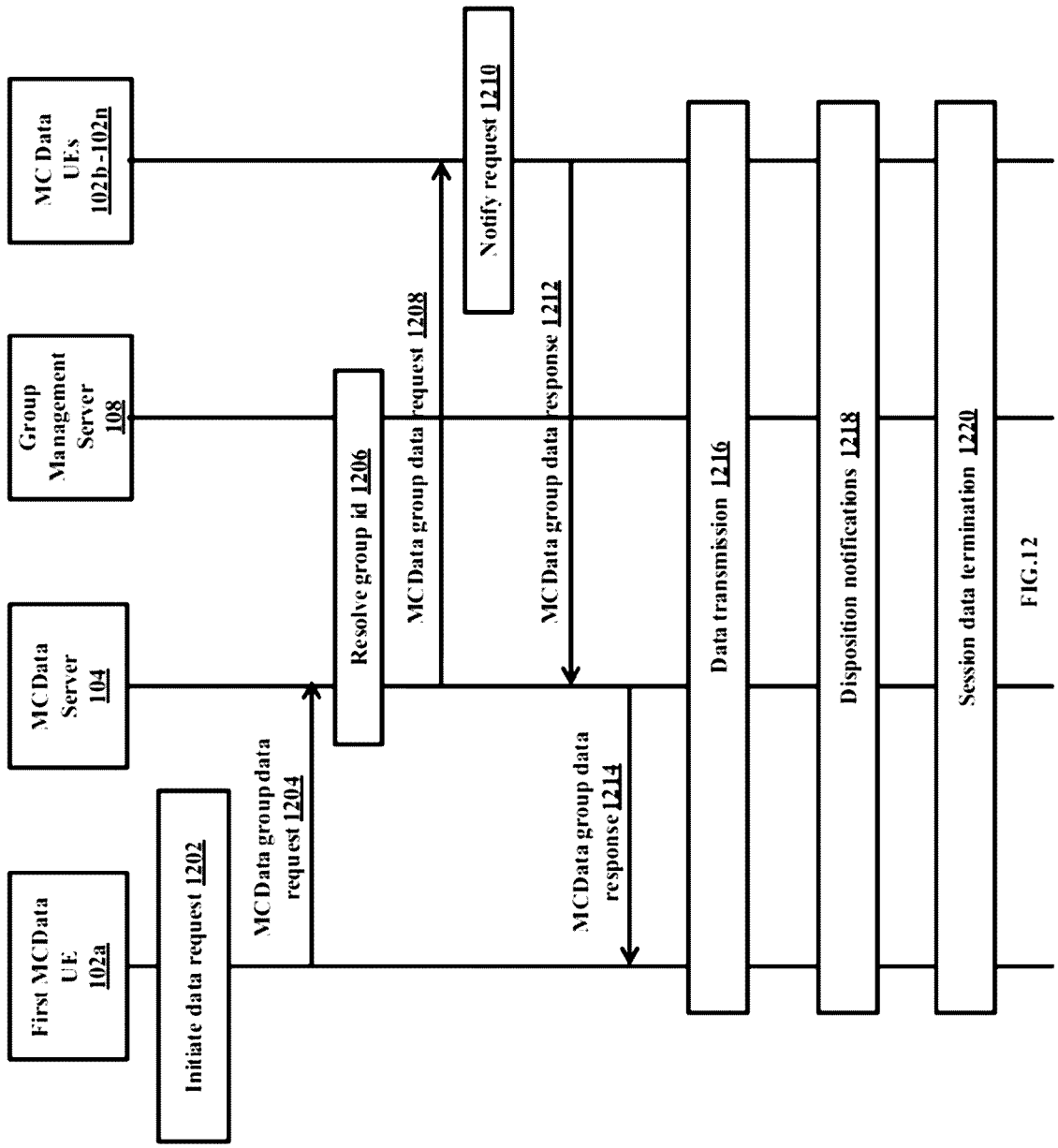
FIG. 12 is a sequence diagram illustrating various signalling messages communicated between the first MC Data UE, the MC Data server and the group of second MC Data UEs for a bidirectional group SDS session using the media plane, according to an embodiment as disclosed herein.

FIG. 12 is a sequence diagram illustrating various signalling messages communicated between the first MC Data UE, the MC Data server and the group of second MC Data UEs 102*b*-102*n* for a bidirectional group SDS session using the media plane, according to an embodiment as disclosed herein.

Referring to FIG. 12, the first MC Data UE 102*a* initiates a MC Data communication session with the group of second MC Data UEs 102*b*-102*n* for exchanging SDS data transactions between the group participants, with or without disposition request using MC Data-SDS-1 and MC Data-SDS-2 reference points. Further, it is assumed that the MC Data UEs 1 to n 102*a*-102*n* belong to the same group and the MC Data UEs 1 to n 102*a*-102*n* are already registered for receiving MC Data service and affiliated.

At step 1202, the first MC Data UE 102*a* initiates a SDS group data transfer request to the group of second MC Data UEs 102*b*-102*n* by selecting a pre-configured group (identified by a group identifier associated with the group of second MC Data UEs 102*b*-102*n*) and optionally particular members from the group of second MC Data UEs 102*b*-102*n*.

At step 1204, the first MC Data UE 102*a* sends a MC Data group data request message to the MC Data server 104. The MC Data group data request message contains target recipient(s) as selected by the first MC Data UE 102*a*. Further, the MC Data group data request message also contains the conversation identifier, the payload destination type, the disposition type and the transaction type as the information elements. The conversation identifier in the MC Data group data request message represents a message thread.

At step 1206, the MC Data server 104 receives the MC Data group data request message sent by the first MC Data UE 102*a* and determines whether the first MC Data UE 102*a* is authorized to send MC Data group data request message. Further, the MC Data server 104 resolves the group identifier associated with the group of second MC Data UEs 102*b*-102*n* to determine the second group of MC Data UEs 102*b*-102*n* and their affiliation status, based on the information received from the group management server 108.

The MC Data server 104 also determines whether any policy is to be asserted to limit certain types of message or content to certain members due, for example, to location or user privilege or affiliation.

At step 1208, the MC Data server 104 sends the MC Data group data request message received from the first MC Data UE 102a to each of the MC Data UEs 102b-102n.

At step 1210, the MC Data UEs 102b-102n optionally notify the users about the incoming MC Data group data request message.

At step 1212, the MC Data UEs 102b-102n can either accept or reject the MC Data group data request message and the corresponding result is the MC Data group data response message which is sent to the MC Data server 104 by the MC Data UEs 102b-102n.

At step 1214, the MC Data server 104 forwards the MC Data group data response message received from the MC Data UEs 102b-102n to the first MC Data UE 102a.

At step 1216, the first MC Data UE 102a and the MC Data UEs 102b-102n after having successfully established the media plane for data communication and transmit the SDS data. The MC Data group data request message may contain disposition request if indicated by the first MC Data UE 102a. If the payload is for MC Data user consumption (e.g. is not application data, is not command instructions, etc.) then the MC Data UEs 102b-102n may be notified.

At step 1218, if MC Data disposition was requested by either of the MC Data UEs i.e., the first MC Data UE 102a and the MC Data UEs 102b-102n, then the receiving MC Data UE initiates the MC Data disposition notification message for delivery, read reports to the disposition requesting MC Data UE. The MC Data disposition notification from MC Data UEs may be stored by the MC Data server 104 for disposition history interrogation from authorized users.

Further, at step 1220, the first MC Data UE 102a and the MC Data UEs 102b-102n release the established media plane for the SDS data exchange after the SDS data transaction is complete.

Figure 13:
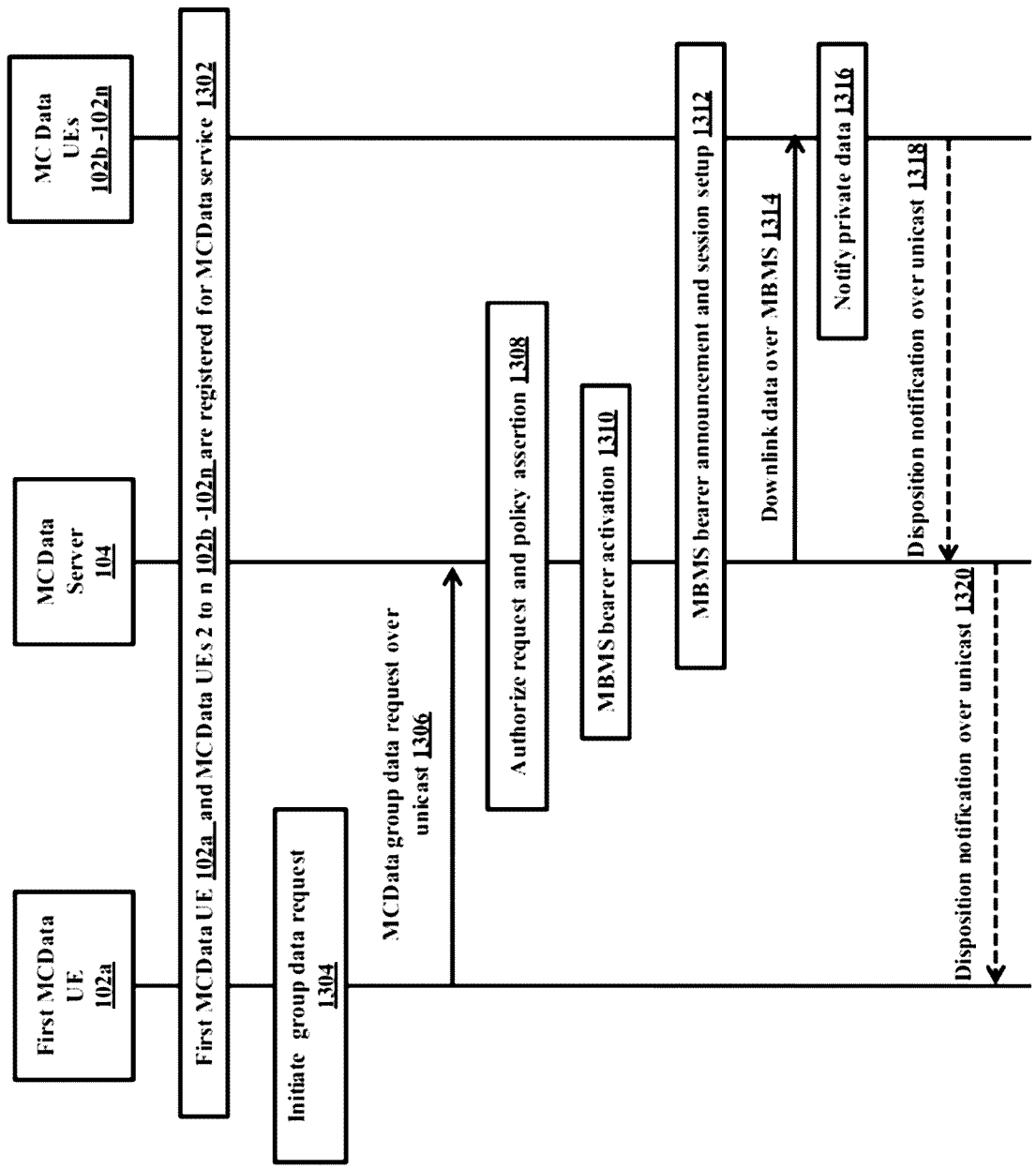
FIG. 13 is a sequence diagram illustrating various signalling messages communicated between the first MC Data UE, the MC Data server and the group of second MC Data UEs for a SDS multicast data over multimedia broadcast/multicast service (MBMS), according to an embodiment as disclosed herein.

FIG. 13 is a sequence diagram illustrating various signalling messages communicated between the first MC Data UE, the MC Data server and the group of second MC Data UEs 102b-102n for a unidirectional SDS multicast data over MBMS, according to an embodiment as disclosed herein.

Referring to the FIG. 13, relates to the case where the first MC Data UE 102a initiates data communication for sending data to multiple MC Data UEs (i.e., MC Data UEs 102b-102n), with or without the disposition request.

At step 1302, the MC Data server 104 recognizes that the first MC Data UE 102a and the group of second MC Data UEs 102b-102n are already registered for receiving MC Data service.

At step 1304, the first MC Data UE 102a wants to initiate a data communication request for the group of second MC Data UEs 102b-102n. The first MC Data UE 102a may initiate data communication request to the group of second MC Data UEs 102b-102n either by selecting a list of the group of second MC Data UEs 102b-102n or by selecting a pre-configured URI list or by selecting a pre-configured group.

At step 1306, the MC Data group data request is sent over unicast to the MC Data Server 104. If the data size is within the allowed limits over the MC Data-1 interface, then the data is transmitted towards the MC Data server 104 (via SIP core) over the signalling plane in the uplink (as shown in FIG. 7). If the data size is not within the allowed limits over the MC Data-1 interface, then the data is transmitted over the media plane in the uplink (as shown in FIG. 8). The MC Data group data request contains payload in the form of at least one of text, binary, application data and URL. The MC Data group data request may contain only one MC Data user or list of MC Data users or a pre-configured URI list or a pre-configured group as selected by the first MC Data UE 102a. The MC Data group data request contains conversation identifier for the message thread indication. If the MC Data group data request should be coupled with the previously sent or received messages or message flows; the message thread indication shall use the same indication as was used for the previous messages. If the conversation hang timer has expired then a new conversation identifier is included and previous messages are no longer correlated. The MC Data group data request may contain disposition request if indicated by the first MC Data UE 102a.

At step 1308, the MC Data server 104 checks whether the first MC Data UE 102a is authorized to send MC Data group data request. If the request is initiated towards the group of second MC Data UEs 102b-102n then URI list or group id is resolved to its members e.g., by contacting group management server 108. The MC Data server 104 also checks whether any policy is to be asserted to limit certain types of message or content to certain members for example, to location or user privilege or affiliation. MC Data server 104 determines the group of second MC Data UEs 102b-102n after policy assertion for sending the MC Data standalone data request.

At step 1310, the MC Data server 104 activates a MBMS bearer. The activation of the MBMS bearer is done on MB2-C reference point and according to 3GPP TS 23.468. The MBMS bearer will be used for transmitting the data in the downlink.

At step 1312, the MC Data server 104 sends the MBMS bearer announcement to the group of second MC Data UEs 102b-102n. Further, the multiple MC Data UEs on receiving the MBMS bearer announcement initiates the session setup for receiving the data over the MBMS.

At step 1314, the MC Data server 104 transmits the data over the MBMS bearer in the downlink. The media packets are detected and delivered to the group of second MC Data UEs 102b-102n.

At step 1316, the group of second MC Data UEs 102b-102n receiving the media packets notify the MC Data server 104 about the incoming data if the payload is for MC Data user consumption.

If MC Data disposition was requested by the first MC Data UE 102a, then the group of second MC Data UEs 102b-102n which receive the data will initiate the MC Data disposition notification for delivery, read reports over unicast, at step 1318. The MC Data disposition notification from each of the group of second MC Data UEs 102b-102n is stored by the MC Data server 104 for disposition history interrogation from authorized users.

Further, at step 1320, the MC Data disposition notification is sent to the disposition requesting first MC Data UE 102a through unicast.

Figure 14:
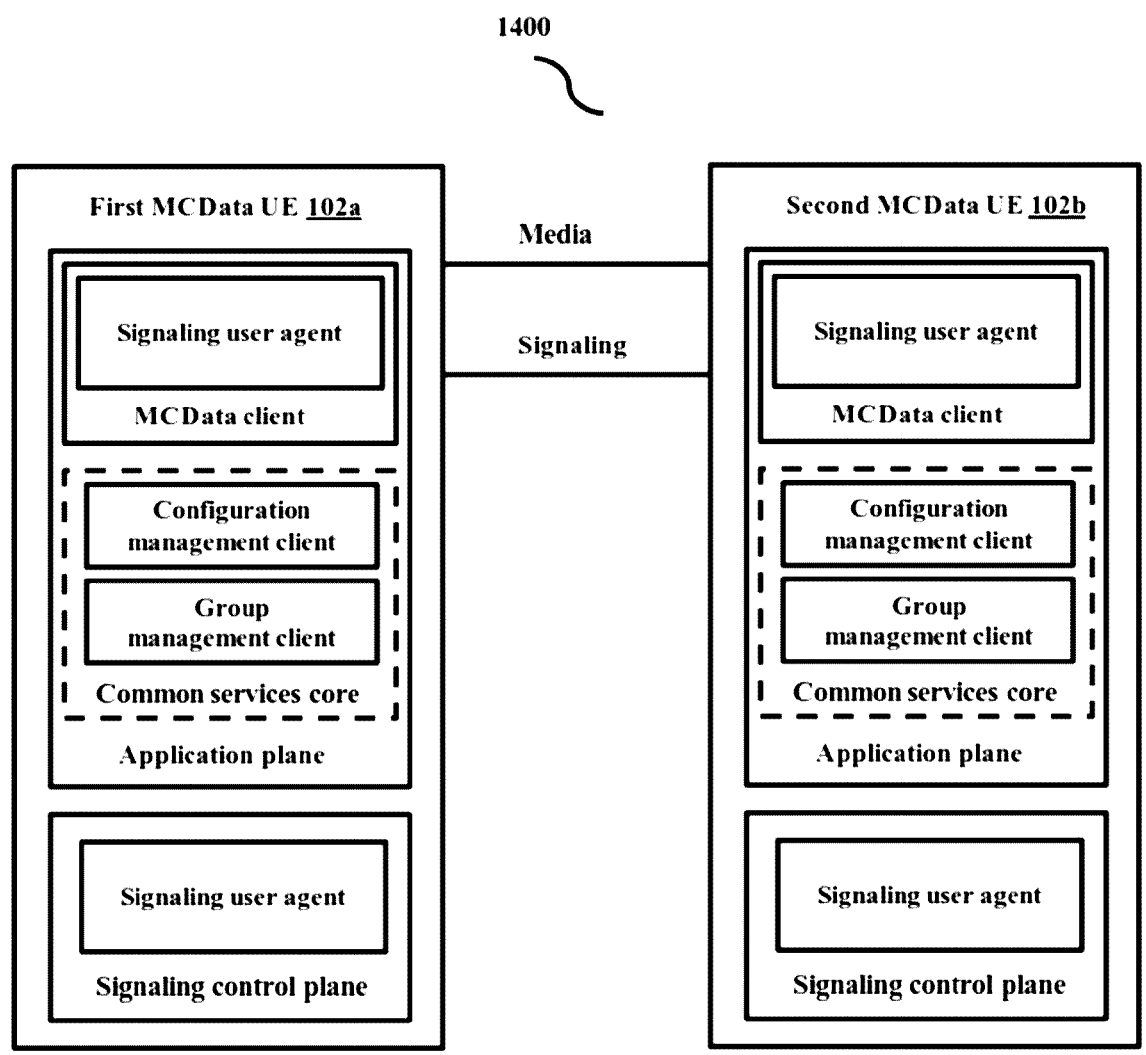
FIG. 14 illustrates an application plane functional model for SDS in an off-network MC Data communication system, according to an embodiment as disclosed herein.

FIG. 14 illustrates application plane functional model for SDS in a off-network MC Data communication system 1400, according to an embodiment as disclosed herein. In an embodiment, the MC Data services can be provided over off-network MC Data communication system 1400. In such deployments, the MC Data UEs communicate directly with each other without the MC Data server 104 for centralized support for the SDS. The off-network MC Data communication system 1400 is shown in the FIG. 14.

As depicted in the FIG. 14, the first MC Data UE 102a communicates directly with the second MC Data UE 102b.

The first MC Data UE 102*a* sends short data to the second MC Data UE 102*b* over signaling control plane. The application plane functional model for SDS is as shown in the FIG. 14.

Figure 15:
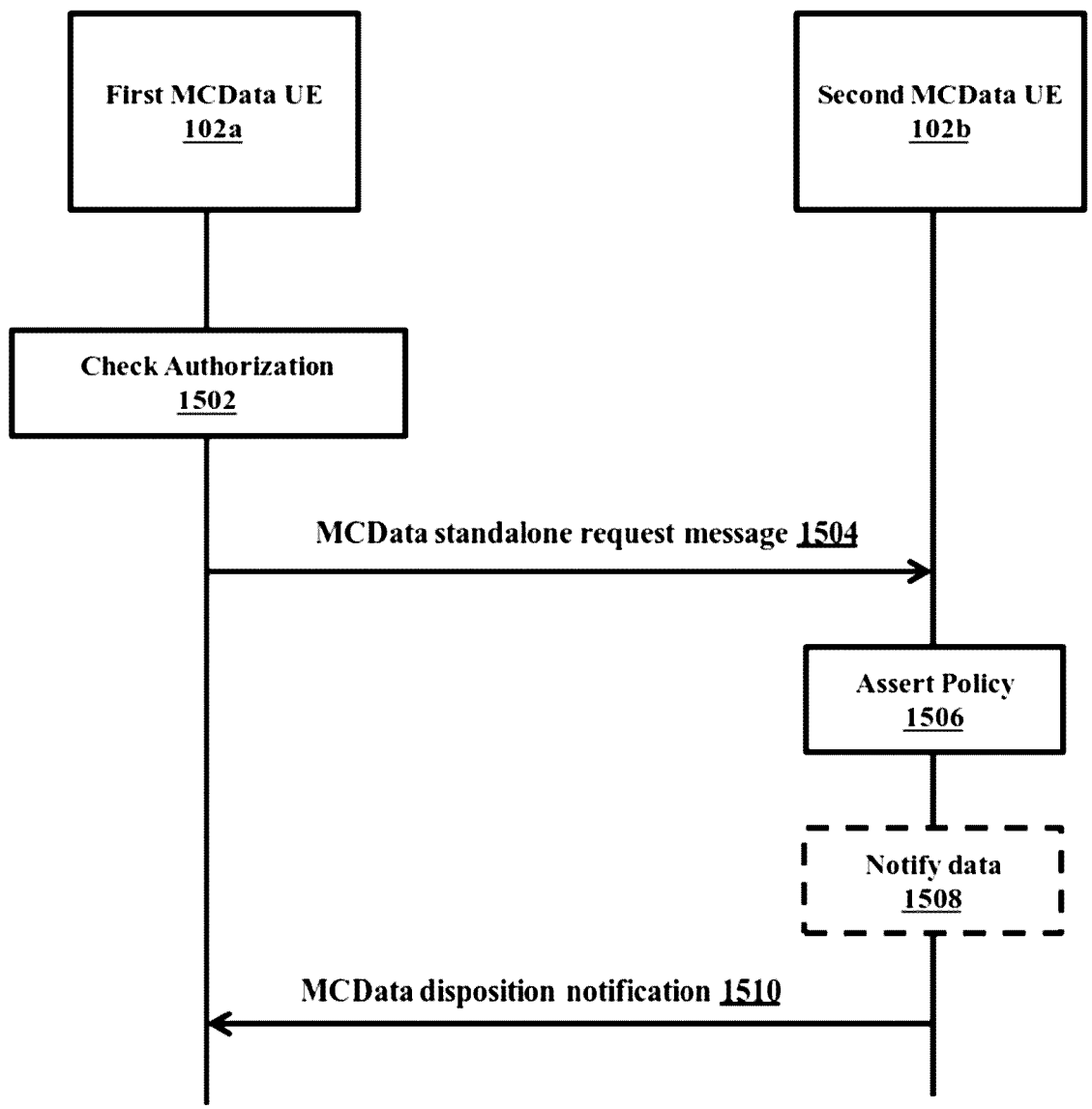
FIG. 15 is a sequence diagram illustrating various signaling messages for one-to-one standalone SDS using signaling control plane in the off-network MC Data communication system, according to an embodiment as disclosed herein.

FIG. 15 is a sequence diagram illustrating various signaling messages for one-to-one standalone SDS using signaling control plane in the off-network MC Data communication system, according to an embodiment as disclosed herein.

The FIG. 15 describes procedures for the off-network one-to-one standalone SDS in which the first MC Data UE 102*a* initiating one-to-one MC Data communication for sending standalone SDS data to the second MC Data UE 102*b*, with or without disposition request. Standalone refers to sending unidirectional data in one transaction. The SDS data size is assumed to be pre-configured.

The following are the pre-conditions for the off-network one-to-one standalone SDS using signaling control plane:

The first MC Data UE 102*a* initiates communication for sending standalone SDS data to the second MC Data UE 102*b*.

The first MC Data UE 102*a* and the second MC Data UE 102*b* are members of the same ProSe Discovery group and are ProSe 1:1 direct communication capable.

The first MC Data UE 102*a* discovers the second MC Data UE 102*b* in proximity, using ProSe Discovery procedures.

As shown in the FIG. 15, the various signaling messages for the off-network one-to-one standalone SDS using signaling control plane are as detailed below:

At step 1502, the first MC Data UE 102*a* checks whether the first MC Data UE 102*a* is authorized to send a MC Data standalone data request.

At step 1504, if the first MC Data UE 102*a* is authorized, the first MC Data UE 102*a* sends the MC Data standalone data request towards the second MC Data UE 102*b*. The MC Data standalone data request contains conversation identifier for message thread indication. The MC Data standalone data request may contain disposition request if indicated by the user at the first MC Data UE 102*a*.

At step 1506, on receiving a MC Data standalone data request, the second MC Data UE 102*b* checks whether any policy is to be asserted to limit certain types of message or content to certain members due, for example, to a location or a user privilege.

At step 1508, if the policy assertion is positive and the payload is for MC Data user consumption (e.g. is not application data, is not command instructions, etc.) then the MC Data user of the second MC Data UE 102*b* may be notified, otherwise, the MC Data user of second MC Data UE 102*b* shall not be notified. In an embodiment, if the policy assertion is negative, the second MC Data UE 102*b* sends an appropriate notification to the first MC Data UE 102*a*.

At step 1510, if the MC Data disposition is requested by the MC Data user at the first MC Data UE 102*a*, then the second MC Data UE 102*b* initiates a MC Data disposition notification for delivery and read reports.

Figure 16:
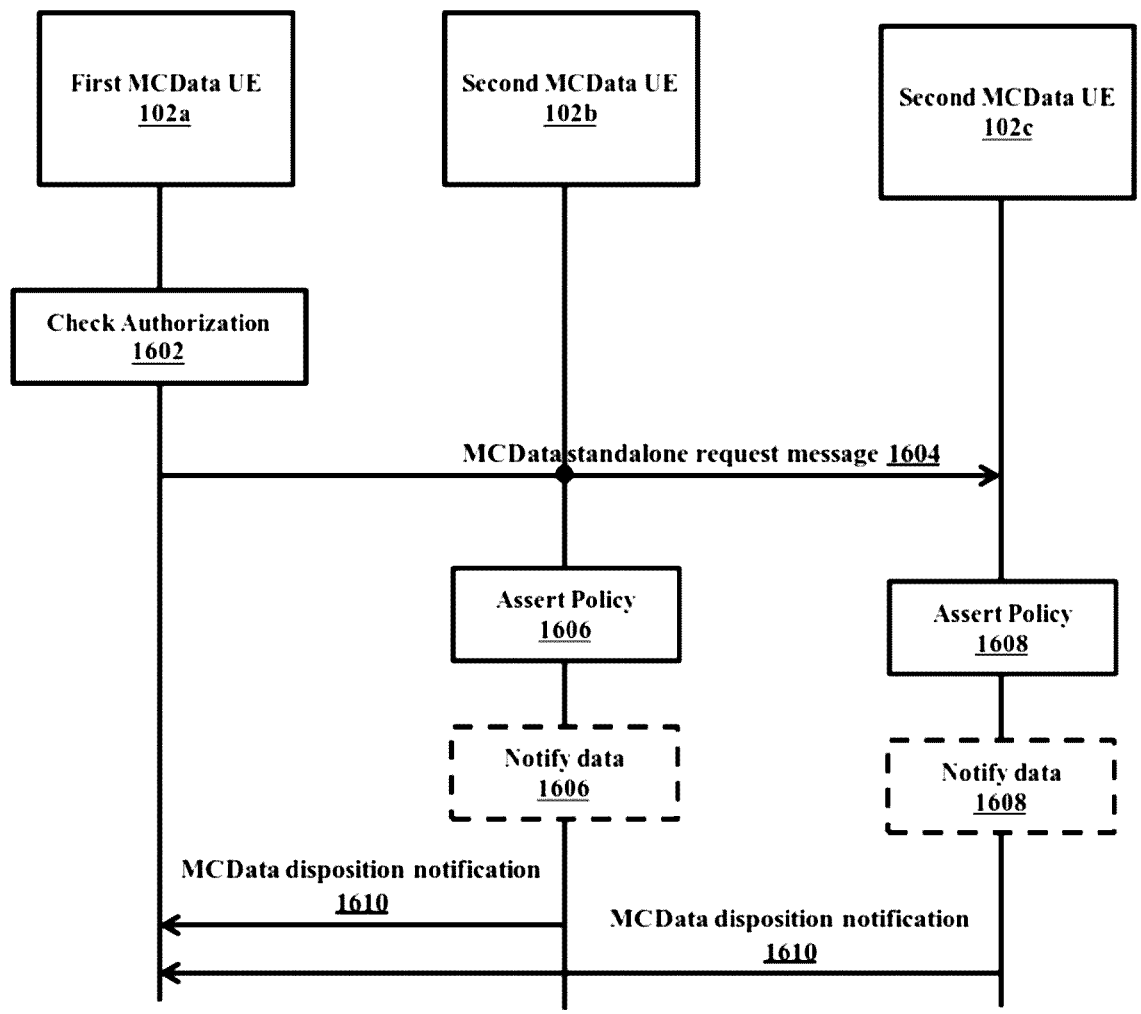
FIG. 16 is a sequence diagram illustrating various signaling messages for group standalone SDS using signaling control plane in the off-network MC Data communication system, according to an embodiment as disclosed herein.

FIG. 16 is a sequence diagram illustrating various signaling messages for group standalone SDS using signaling control plane in the off-network MC Data communication system, according to an embodiment as disclosed herein.

The FIG. 16 describes procedures for the off-network in which the first MC Data UE 102*a* initiating group MC Data communication for sending standalone SDS data to a MC Data group, with or without disposition request. Standalone refers to sending unidirectional data in one transaction. The SDS data size is assumed to be pre-configured. Although the FIG. 16 shows only the second MC Data UEs 102*b* and 102*c*, it is to be understood that there can be many second MC Data UEs in the group.

The following are the pre-conditions for the off-network one-to-one standalone SDS using signaling control plane:

The first MC Data UE 102*a* has initiated group communication for sending standalone SDS data to the MC Data group.

Information for ProSe direct communications corresponding to the MC Data group and its mapping to ProSe Layer-2 Group ID are pre-configured at the first MC Data UE 102*a*.

The first MC Data UE 102*a* and a group second MC Data UEs 102*b*-102*n* are members of the same MC Data group.

As shown in the FIG. 16, sequence of signaling steps are for group standalone SDS using signaling control plane are as described below:

At step 1602, the first MC Data UE 102*a* checks whether the first MC Data UE 102*a* is authorized to send a MC Data group standalone data request At step 1604, if the first MC Data UE 102*a* is authorized, then the first MC Data UE 102*a* sends the MC Data group standalone data request towards the group of second MC Data UEs 102*b* and 102*c*. The MC Data group standalone data request contains conversation identifier for message thread indication. The MC Data group standalone data request may contain disposition request if indicated by the MC Data user at the first MC Data UE 102*a*. In an embodiment, if MC Data group standalone data request contains disposition request, it shall also contains IP address of the first MC Data UE 102*a*. In another embodiment, the disposition notifications are sent to the group.

At step 1606, on receiving the MC Data group standalone data request, the second MC Data UEs checks whether any policy is to be asserted to limit certain types of message or content to certain members due, for example, to a location or a user privilege.

At step 1608, if the policy assertion is positive and the payload is for the MC Data user consumption (e.g. is not application data, is not command instructions, etc.) then the MC Data user may be notified, otherwise, the MC Data user shall not be notified. In an embodiment, if the policy assertion was negative, the second MC Data UEs 102*b* and 102*c* send an appropriate notification to the first MC Data UE 102*a*.

At step 1610, if the MC Data disposition was requested by the MC Data user at the first MC Data UE 102*a*, then the second MC Data UEs 102*b* and 102*c* initiate a MC Data disposition notification for delivery and read reports.

Figure 17:
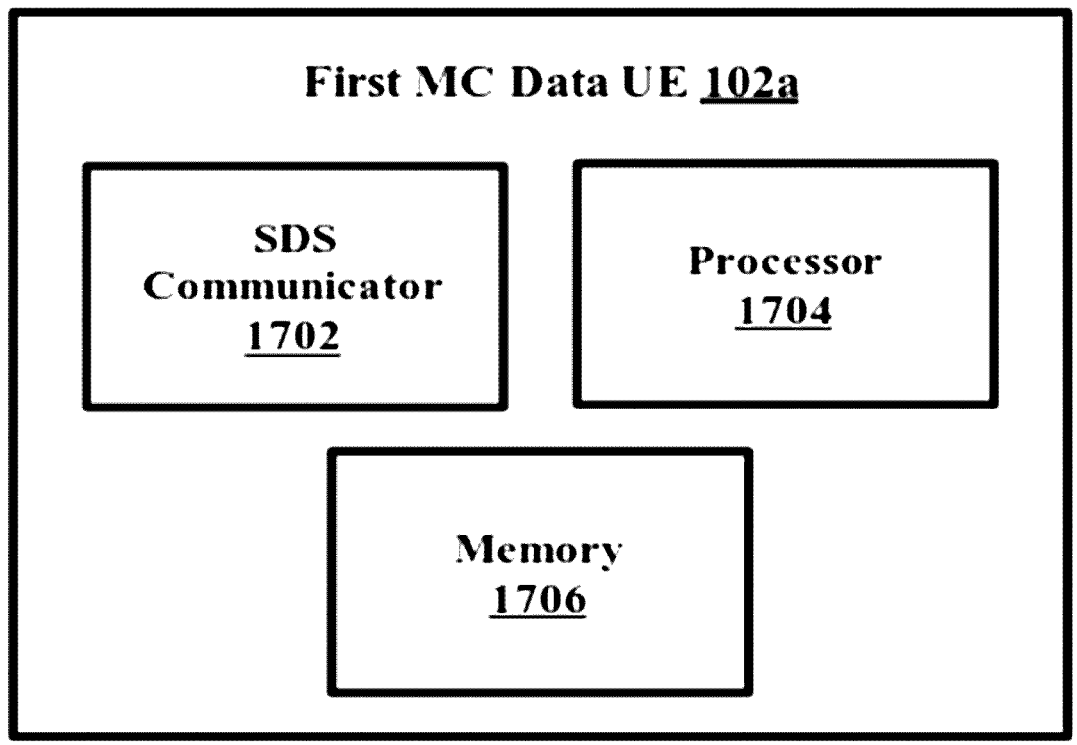
FIG. 17 illustrates various units of a first MC Data UE for SDS using the signaling control plane in the off-network MC Data communication system, according to an embodiment as disclosed herein.

FIG. 17 illustrates various units of a first MC Data UE for SDS using the signaling control plane in the off-network MC Data communication system, according to an embodiment as disclosed herein. As depicted in the FIG. 17, the first MC Data UE includes a SDS communicator 1702, a processor 1704 and a memory 1706.

In an embodiment, the SDS communicator 1702 can be configured to transmit the MC Data standalone message with the conversation identifier to one or more second MC Data UEs 102*b*-102*n*. The SDS communicator 1702 can be configured to transmit the MC Data standalone message with a disposition request. Further, the SDS communicator 1702 can be configured to receive the MC Data disposition notification message from the one or more second MC Data UEs 102*b*-102*n* based on the disposition request in the MC Data standalone request message.

In an embodiment, the processor 1704 (for example; a hardware unit, an apparatus, a Central Processing Unit (CPU), a Graphics Processing Unit (GPU), etc.,) communicatively coupled to a memory 1706 (e.g., a volatile memory and/or a non-volatile memory); the memory 1706 includes storage locations configured to be addressable through the processor 1704.

In an embodiment, the memory 1706 can be configured to store the MC Data disposition notification messages received from the second MC Data UEs 102b-102n for disposition history interrogation from authorized MC Data UEs. The memory 1706 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1706 may, in some examples, be considered a non-transitory storage medium. The term "non-transitory" may indicate that the storage medium is not embodied in a carrier wave or a propagated signal. However, the term "non-transitory" should not be interpreted that the memory 1706 is non-movable. In some examples, the memory 1706 can be configured to store larger amounts of information than the memory. In certain examples, a non-transitory storage medium may store data that can, over time, change (e.g., in Random Access Memory (RAM) or cache).

Figure 18:
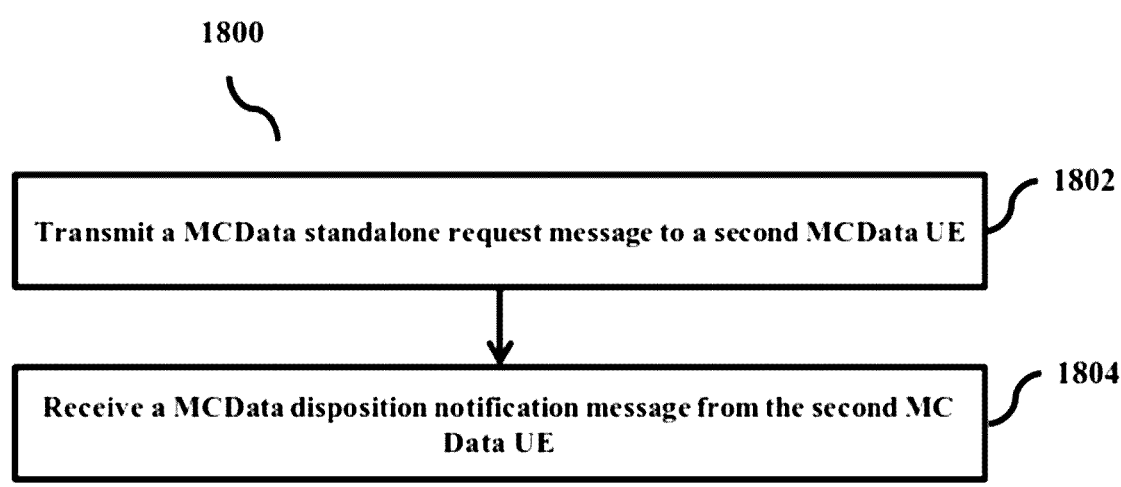
FIG. 18 is a flow diagram illustrating a method for managing one-to-one SDS in the off-network MC Data communication system by the first MC Data UE, according to an embodiment as disclosed herein.

FIG. 18 is a flow diagram 1800 illustrating a method for managing one-to-one SDS in the off-network MC Data communication system 1400, by the first MC Data UE 102a, according to an embodiment as disclosed herein. At step 1802, the method includes transmitting the MC Data standalone request message to the second MC Data UE 102b. The method allows the SDS communicator 1702 to transmit the MC Data standalone request message to the second MC Data UE 102b.

At step 1804, the method includes receiving the MC Data disposition notification message from the second MC Data UE 102b. The method allows the SDS communicator 1702 to receive the MC Data disposition notification message from the second MC Data UE 102b.

Figure 19:
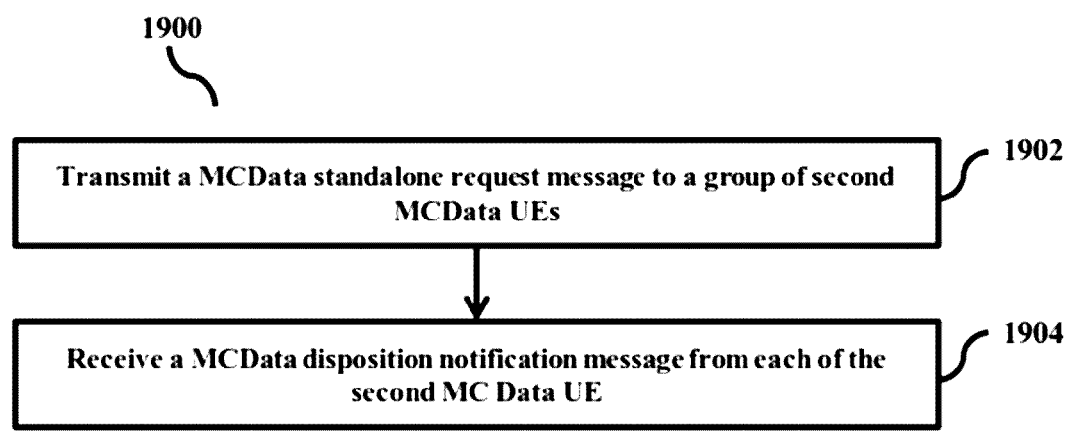
FIG. 19 is a flow diagram illustrating a method for managing group standalone SDS in the off-network MC Data communication system, by the first MC Data UE, according to an embodiment as disclosed herein.

FIG. 19 is a flow diagram 1900 illustrating a method for managing group standalone SDS in the off-network MC Data communication system 1400, according to an embodiment as disclosed herein.

At step 1902, the method includes transmitting the MC Data standalone request message to a group of second MC Data UEs 102b-102n. The method allows the SDS communicator 1702 to transmit the MC Data standalone request message to a group of second MC Data UEs 102b-102n.

At step 1904, the method includes receiving the MC Data disposition notification message from each of the second MC Data UEs 102b-102n. The method allows the SDS communicator 1702 to receive the MC Data disposition notification message from each of the second MC Data UEs 102b-102n.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for performing short data service (SDS) by a server in a communication system, the method comprising:
receiving a mission critical data (MC Data) standalone request from a first user equipment (UE), the MC Data standalone request comprising information elements associated with at least one of a conversation identifier, a payload destination type, a disposition type or a transaction type;
determining whether the first UE is authorized to send the MC data standalone request and whether a policy is to be asserted to limit a certain type of message or content to a certain UE;
transmitting the MC Data standalone request to at least one second UE on determining that the first UE is authorized to send the MC Data standalone request;
receiving a MC Data disposition notification from the at least one second UE based on a disposition request in the MC Data standalone request; and
transmitting the MC Data disposition notification to the first UE.

2. The method of claim 1, wherein it is determined based on the disposition type whether the MC Data disposition notification is requested by the first UE.

3. The method of claim 1,
wherein a media plane for data communication is established between the first UE and the at least one second UE, and
wherein SDS data is transmitted from the first UE to the at least one second UE over the media plane.

4. The method of claim 3,
wherein the SDS data is in a form of text, binary, application data, uniform resource locater (URL) or a combination thereof.

5. A server for performing short data service (SDS) in a communication system, the server comprising:
a transceiver; and
a controller coupled with the transceiver and configured to:
receive a mission critical data (MC Data) standalone request from a first user equipment (UE), the MC Data standalone request comprising information elements associated with at least one of a conversation identifier, a payload destination type, a disposition type or a transaction type,
determine whether the first UE is authorized to send the MC data standalone request and whether a policy is to be asserted to limit a certain type of message or content to a certain UE,
transmit the MC Data standalone request to at least one second UE on determining that the first UE is authorized to send the MC Data standalone request,
receive a MC Data disposition notification from the at least one second UE based on a disposition request in the MC Data standalone request, and
transmit the MC Data disposition notification to the first UE.

6. The server of claim 5, wherein it is determined based on the disposition type whether the MC Data disposition notification is requested by the first UE.

7. The server of claim 5,
wherein a media plane for data communication is established between the first UE and the at least one second UE, and
wherein SDS data is transmitted from the first UE to the at least one second UE over the media plane.

8. The server of claim 7,
wherein the SDS data is in a form of text, binary, application data, uniform resource locater (URL) or a combination thereof.

9. A method for performing short data service (SDS) by a first user equipment (UE) in a communication system, the method comprising:
determining whether the first UE is authorized to send a mission critical data (MC data) standalone request comprising information elements associated with at least one of a conversation identifier, a payload destination type, a disposition type and a transaction type;
transmitting the MC Data standalone request to at least one second UE on determining that the first UE is authorized to send the MC Data standalone request; and
receiving a MC Data disposition notification from the at least one second UE based on a disposition request in the MC Data standalone request.

10. The method of claim 9, wherein it is determined based on the disposition type whether the MC Data disposition notification is requested by the first UE.

11. A first user equipment (UE) for performing short data service (SDS) in a communication system, the first UE comprising:
a transceiver; and
a controller coupled with the transceiver and configured to:
determine whether the first UE is authorized to send a mission critical data (MC data) standalone request comprising information elements associated with at least one of a conversation identifier, a payload destination type, a disposition type and a transaction type,
transmit the MC Data standalone request to at least one second UE on determining that the first UE is authorized to send the MC Data standalone request, and
receive a MC Data disposition notification from the at least one second UE based on a disposition request in the MC Data standalone request.

12. The first UE of claim 11, wherein it is determined based on the disposition type whether the MC Data disposition notification is requested by the first UE.

* * * * *